United States Patent
McCloskey et al.

(10) Patent No.: US 9,218,697 B2
(45) Date of Patent: Dec. 22, 2015

(54) SYSTEMS AND METHODS FOR AUTHENTICATING OBJECTS USING IR

(71) Applicant: WABA Fun, LLC, Bromfield, CO (US)

(72) Inventors: David C. McCloskey, Erie, CO (US); Jeffrey L. Barnett, Fort Collins, CO (US); Bradley Matthew White, Lafayette, CO (US); Stanley R. James, San Francisco, CA (US); Mark Andrew Crouch, Boulder, CO (US)

(73) Assignee: Waba Fun LLC, Broomfield, CO (US)

( * ) Notice: Subject to any disclaimer, the term of this patent is extended or adjusted under 35 U.S.C. 154(b) by 340 days.

(21) Appl. No.: 13/691,724

(22) Filed: Nov. 30, 2012

(65) Prior Publication Data

US 2013/0135081 A1    May 30, 2013

Related U.S. Application Data

(60) Provisional application No. 61/565,312, filed on Nov. 30, 2011.

(51) Int. Cl.
| | |
|---|---|
| *G06K 7/10* | (2006.01) |
| *G07C 9/00* | (2006.01) |
| *G07D 7/12* | (2006.01) |
| *A63F 13/20* | (2014.01) |
| *A63F 13/40* | (2014.01) |

(52) U.S. Cl.
CPC ............ *G07C 9/00111* (2013.01); *A63F 13/06* (2013.01); *A63F 13/10* (2013.01); *G07D 7/12* (2013.01); *A63F 2300/1087* (2013.01); *A63F 2300/69* (2013.01)

(58) Field of Classification Search
CPC ...... G06K 7/14; G06K 7/1404; G06K 7/1439
USPC .......................... 235/462.01, 462.46, 472.02
See application file for complete search history.

(56) References Cited

U.S. PATENT DOCUMENTS

| | | | |
|---|---|---|---|
| 4,922,104 A * | 5/1990 | Eguchi et al. ............ 250/339.08 |
| 5,402,364 A | 3/1995 | Kitoh | |
| 5,691,909 A | 11/1997 | Frey et al. | |
| 6,512,993 B2 | 1/2003 | Kacyra et al. | |
| 6,612,494 B1 | 9/2003 | Outwater | |
| 7,091,344 B2 * | 8/2006 | Hall et al. ..................... 544/249 |
| 7,841,264 B2 | 11/2010 | Kim et al. | |
| 2004/0188528 A1 | 9/2004 | Alasia et al. | |

(Continued)

FOREIGN PATENT DOCUMENTS

JP    2004-171109    6/2004

OTHER PUBLICATIONS

PCT/US2012/067459 International Search Report & Written Opinion mailed Mar. 11, 2013; 10 pages.

(Continued)

*Primary Examiner* — Daniel St Cyr
(74) *Attorney, Agent, or Firm* — Lathrop & Gage LLP

(57) ABSTRACT

Systems and methods authenticate an object using IR. IR is projected at a first wavelength onto the object and a first image of the object is captured during the projection of the IR. The object is authenticated by processing the first image to detect IR fluorescence from an IR fluorescing material incorporated into the object in response to the projected IR, where presence of the IR fluorescence within the first image indicates authentication of the object.

16 Claims, 25 Drawing Sheets

(56) References Cited

U.S. PATENT DOCUMENTS

| | | |
|---|---|---|
| 2008/0038494 A1 | 2/2008 | Midgley et al. |
| 2011/0055053 A1 | 3/2011 | Rutschmann |
| 2011/0075916 A1 | 3/2011 | Knothe et al. |

OTHER PUBLICATIONS

MaxMax, Upconversion, Aug. 30, 2012, accessed on the Internet May 22, 2013, http://www.maxmax.com/aIRUpConversion.asp; 3 pages.

MaxMax, IR Ink, Aug. 30, 2012, accessed on the Internet May 22, 2013, http://www.maxmax.com/aXRayIRInks.asp; 6 pages.

New Prismatic Co., Invisible Fluorescent Material, Sep. 6, 2010, accessed on the Internet May 22, 2013, http://www.colorchange.com.tw/english/index.php/invisible-fluorescent-introduction.html; 3 pages.

PCT Application PCT/US2012/067459 International Preliminary Report on Patentability dated Mar. 11, 2014, 38 pages.

\* cited by examiner

SYSTEMS AND METHODS FOR AUTHENTICATING OBJECTS USING IR

RELATED APPLICATIONS

This application claims priority to U.S. patent application Ser. No. 61/565,312, titled "Systems and Methods for Authenticating Objects Using IR", filed Nov. 30, 2011, and incorporated herein by reference.

BACKGROUND

When identifying objects visually, it is often difficult to determine whether the object is authentic. For example, in computer games where the computer utilizes camera systems to identify playing pieces, the computer cannot differentiate between authentic playing pieces and non-authentic pieces. This may lead to non-authentic playing pieces being substituted for authentic playing pieces.

SUMMARY

In one embodiment, a system authenticates an object configured with an infrared (IR) fluorescing material that fluoresces at a first IR wavelength when excited by IR of a second wavelength. The system includes an IR projector for projecting IR at a second wavelength onto the object, an IR camera having a field of view of the object for capturing an IR image of the object at the first wavelength, and a processor executing an algorithm to perform the steps of: controlling the IR projector to generate IR at the second wavelength and to project the IR at the second wavelength onto the object; controlling the IR camera to capture the IR image; and authenticating the objected based upon detected IR at the first wavelength within the IR image.

In another embodiment, a method authenticates an object using IR. IR is projected at a first wavelength onto the object and a first image of the object is captured during the projection of the IR. The object is authenticated by processing the first image to detect IR fluorescence from an IR fluorescing material incorporated into the object in response to the projected IR, where presence of the IR fluorescence within the first image indicates authentication of the object.

In another embodiment, a method ignores, within a computerized game, a non-authentic object. IR is projected at a first wavelength onto the object and a first image of the object is captured during the projection of the IR. A wavelength of fluorescence from the object is detected and compared to a predefined fluorescence wavelength for the object. The object is ignored if the determined wavelength of fluorescence does not match the predefined fluorescence wavelength.

In another embodiment, a method identifies a model constructed from a plurality of components, wherein at least two key components are configured with an IR fluorescing material that has IR fluoresce at a first wavelength when excited by IR of a second wavelength. IR at the second wavelength is projected from an IR projector onto the model and a first image of the model is captured using an IR camera during the projection of the IR. Based upon the IR fluorescence, each of the at least two key components within the image are identified and relative positions of the key components to one another are determined based upon the first image. The model is identified based upon the relative positions.

In another embodiment, an educational tool identifies a model configured with an IR fluorescing material that fluoresces at a first wavelength when excited by IR at a second wavelength. The tool includes an IR projector for projecting IR at the second wavelength onto the model, an IR camera having a field of view of the model for capturing an IR image of the model, and a processor executing an algorithm. The algorithm performs the steps of: controlling the IR projector to generate IR at the second wavelength and project the IR at the second wavelength onto the model, controlling the IR camera to capture the IR image during the projection, and identifying the model based upon IR fluorescence at the first wavelength within the IR image.

In another embodiment, a system for determining orientation of a vehicle, wherein a first portion of the vehicle is configured with a first IR fluorescing material that fluoresces at a first wavelength when excited by IR at a second wavelength and wherein a second portion of the vehicle is configured with a second IR fluorescing material that fluoresces at a third wavelength when excited by the IR at the second wavelength, includes an IR projector for projecting IR at the second wavelength onto the vehicle, an IR camera having a field of view of the vehicle for capturing an IR image of the vehicle, and a processor executing an algorithm. The algorithm performs the steps of: controlling the IR projector to generate IR at the second wavelength and to project the IR at the second wavelength onto the vehicle, controlling the IR camera to capture the IR image, and determining the orientation of the vehicle based upon the wavelength of IR captured within the IR image and the location of the first and second portions on the vehicle.

In another embodiment, a method determines orientation of a vehicle, wherein a first portion of the vehicle is configured with a first IR fluorescing material that fluoresces at a first wavelength when excited by IR at a second wavelength and wherein a second portion of the vehicle is configured with a second IR fluorescing material that fluoresces at a third wavelength when excited by IR at the second wavelength. IR at the second wavelength is projected onto the vehicle. An IR image of the vehicle is captured while projecting the IR, and the orientation of the vehicle is determined based upon the wavelength of IR fluorescence captured within the IR image and the location of the first and second portions on the vehicle. The first portion is located at the front of the vehicle and the second portion is located at the rear of the vehicle.

In another embodiment, a method prevents 3D copying of an object by a 3D scanner that uses infrared (IR) at a first IR wavelength for depth detection. The object with an IR fluorescing material that fluoresces at a second IR wavelength when excited by IR at the first wavelength. The IR fluorescing material absorbs IR at the first wavelength and emits IR at the second IR wavelength which is not detectable by the 3D scanner.

DETAILED DESCRIPTION OF THE DRAWINGS

Figure 1:
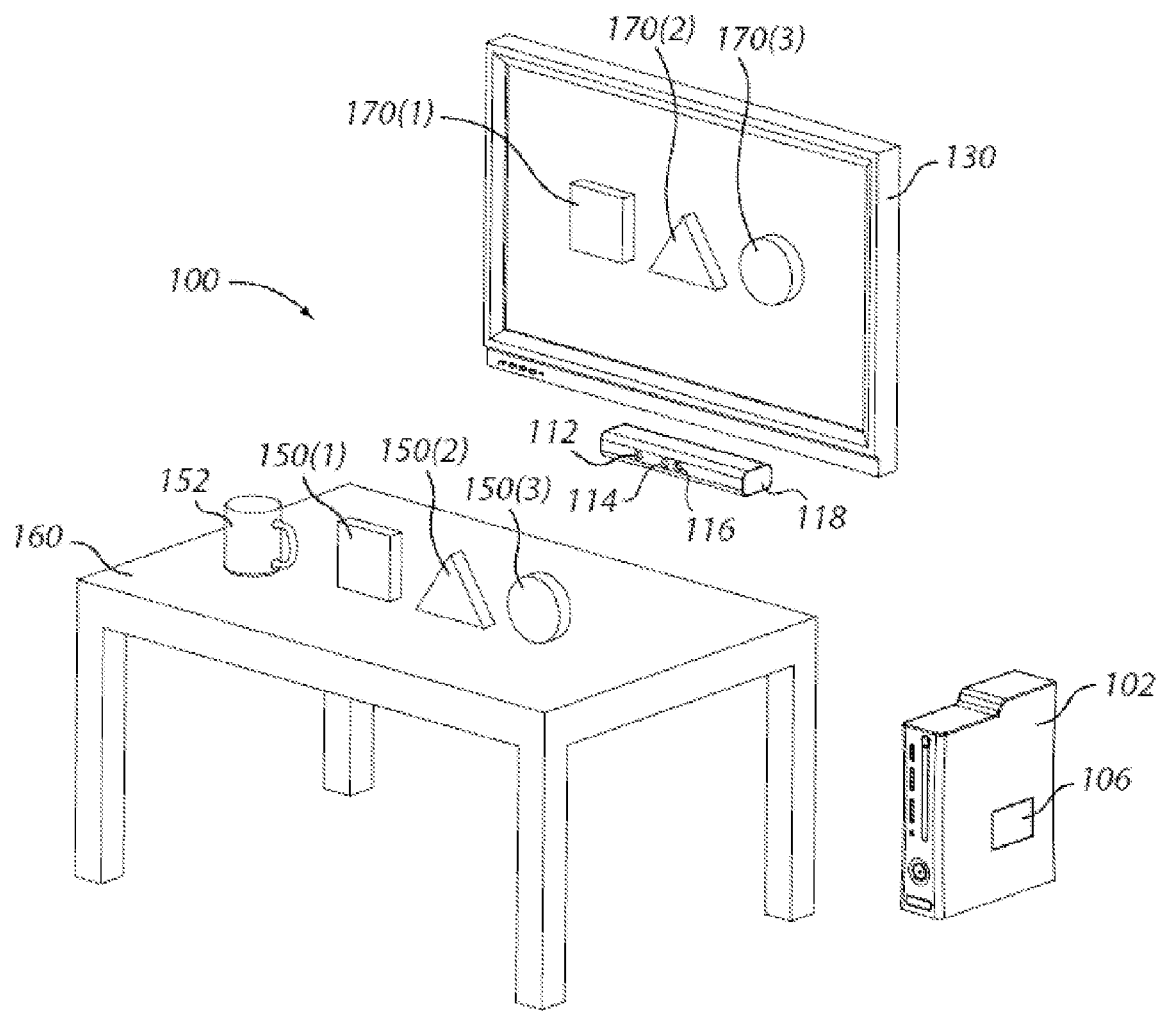
FIG. 1 shows one exemplary system for authenticating objects using infrared (IR), in an embodiment.

An IR fluorescing material receives energy in the form of light at a first wavelength range and converts that energy into light emitted at a second wavelength band. Normally, materials that fluoresce are down-conversion particles that absorb energy at a higher level and shorter wavelength (ultraviolet) and emit energy at a lower level and longer wavelength (visible). Up-conversion materials are a very rare class of inorganic crystals that can absorb multiple photons at a lower energy level and emit one photon at a higher energy level. The up-conversion process is also called an Anti-Stokes shift (see for example http://en.wikipedia.org/wiki/Stokes shift and http://en.wikipedia.org/wiki/Photon conversion). One or more of many different IR fluorescing material may be used without departing from the scope hereof. See for example:

New Prismatic Co. manufactures invisible fluorescent materials suitable for use in toys: http://www.colorchange.com.tw/english/index.php/invisible-fluorescent-introduction.html;

Up-conversion phosphors from MaxMax in NJ:
    http://www.maxmax.com/aIRUpConversion.asp;

Down-conversion Inks from MaxMax:
   http://www.maxmax.com/aXRayIRInks.asp; and
An illuminating illustration on Light and Emissions:
   http://www.hindawi.com/journals/jnm/2010/491471/fig1/

FIG. 1 shows one exemplary system 100 for authenticating objects 150 using infrared (IR). System 100 includes a computer 102 executing software 106, an IR projector 112, an IR camera 114, and a red-green-blue (RGB) camera 116. In the example of FIG. 1, IR projector 112, IR camera 114, and RGB camera 116 are contained within a single housing 118 and are communicatively coupled with computer 102. System 100 may also include an optional display 130, coupled to computer 102, for displaying rendered objects 170 that are generated from virtual objects (see FIG. 2) by software 106 based upon detection (imaging) of objects 150 by cameras 114 and 116.

In the example of FIG. 1, objects 150 are placed on a table 160 within a field of view of cameras 114 and 116 and also within a projection area of IR projector 112. Objects 150 are manufactured to include an IR fluorescing material that fluoresces, when excited by IR from IR projector 112, at a wavelength that is detected by IR camera 114. Table 160 and a coffee mug 152 do not contain the IR fluorescing material and may be differentiated thereby from objects 150 by software 106.

Figure 2:
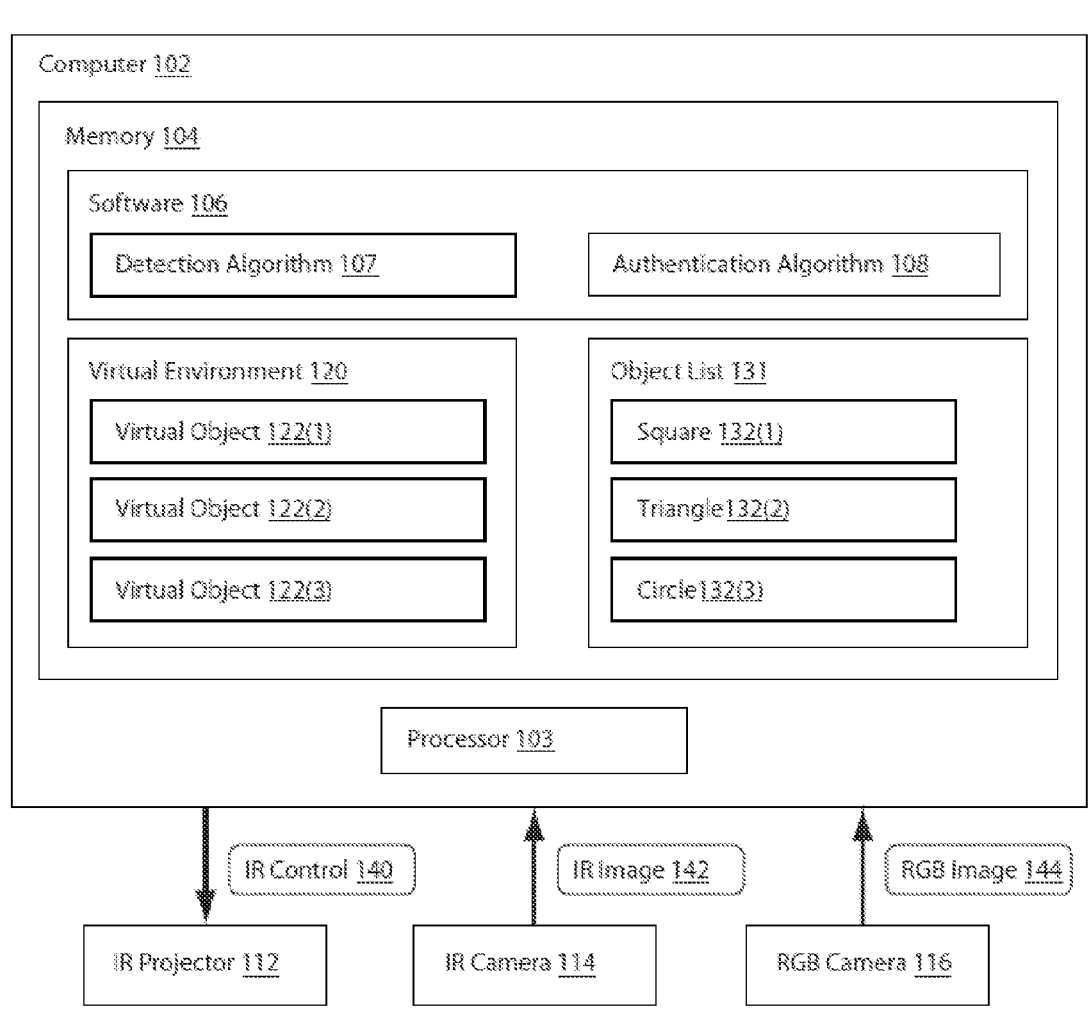
FIG. 2 is a block diagram showing the computer of the system of FIG. 1 in further detail.

FIG. 2 is a block diagram showing system 100 of FIG. 1, and in particular, showing computer 102 in further detail. Computer 102 is for example a personal computer and is shown with memory 104 that stores software 106 and a processor 103 that may execute machine readable instructions of software 106. Memory 104 may represent one or both of volatile memory, such as dynamic random access memory (DRAM), and non-volatile memory, such as hard drive storage, of computer 102. Memory 104 stores an object list 131 that contains an object definition 132 for each of a plurality of objects (e.g. objects 150) that may be identified and authenticated by system 100. Continuing with the example of FIG. 1, object list 131 includes a square definition 132(1), a triangle definition 132(2), and a circle definition 132(3). Each object definition 132 may include a shape definition (e.g., a three dimensional definition of the shape), a color (e.g., red), and an IR tag definition (e.g., an exciting IR wavelength and a fluorescence response IR wavelength of the IR fluorescing material incorporated into the object). For example, a fluorescent compound may be configured to emit at a wavelength of 655 nm when excited by a wavelength of 980 nm.

Software 106, when executed by processor 103, detects objects 150 using IR projector 112, IR camera 114, and RGB camera 116, and stores a representation of these objects as virtual objects 122 within a virtual environment 120 within memory 104. Software 106 includes a detection algorithm 107 and an authentication algorithm 108. Detection algorithm 107 detects objects (e.g., objects 150) within a field of view of RGB camera 116 and optionally within a field of view of IR camera 114. Authentication algorithm 108 determines authenticity of detected objects (e.g., objects 150) by comparing an IR fluorescence from the object, detected by IR camera 114, to the expected IR fluorescence for that object, defined within object list 131.

Continuing with the example of FIGS. 1 and 2, virtual object 122(1) corresponds to object 150(1), virtual object 122(2) corresponds to object 150(2), and virtual object 122(3) corresponds to object 150(3). Each virtual object 122 is for example represented in 3D within virtual environment 120, the shape of which may be predefined, such as when objects 150 are pre-fabricated shapes, and the shape of which is determined, such as when objects 150 are fabricated by a user from a moldable (malleable) substance.

Figure 3:
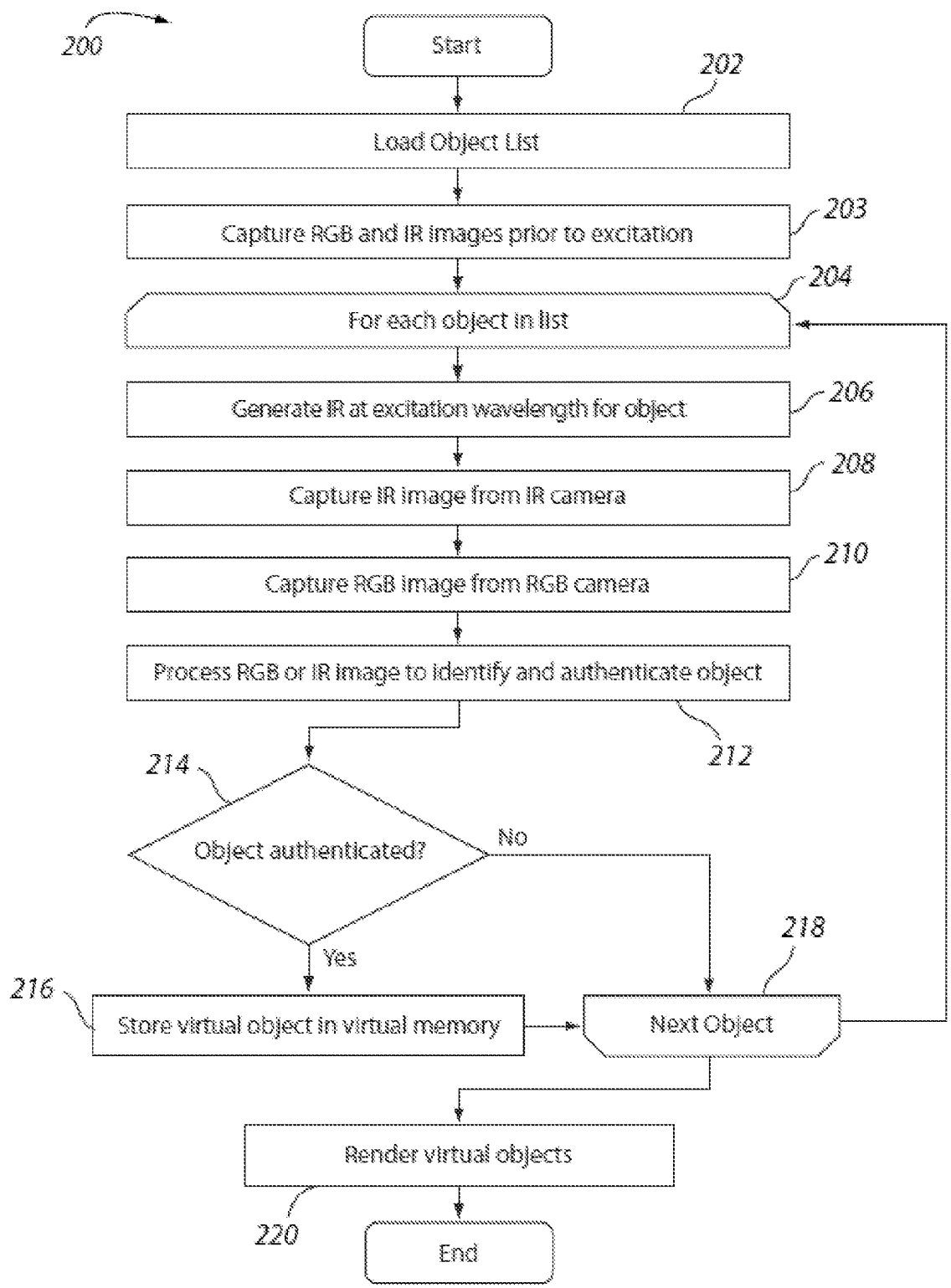
FIG. 3 is a flow chart illustrating one exemplary process for authenticating objects using IR, in an embodiment.

FIG. 3 is a flow chart illustrating one exemplary process 200 for authenticating objects using IR. Process 200 is for example implemented within software 106 of system 100 of FIGS. 1 and 2. In step 202, process 200 loads object definitions. In one example of step 202, object list 131 is predefined and loaded from a non-volatile storage medium into memory 104. In step 203, process 200 captures RGB and IR images prior to excitation of the IR projector. In one example of step 203, IR projector 112 is turned off, if not already off, and IR camera 114 and RGB camera 116 are controlled to capture images of objects 150 within their respective fields of view.

A loop starts at step 204 and ends at step 218, wherein steps 206 through 216 repeat for each object defined within the object list (e.g., object list 131) loaded in step 202. In step 206, process 200 generates IR at the excitation wavelength for the object. In one example of step 206, software 106 controls IR projector 112 to project IR into the IR projection area at a wavelength defined by square definition 132(1) of object list 131. In step 208, process 200 captures an image from the IR camera. In one example of step 208, software 106 controls IR camera 114 to capture IR image 142 and to send IR image 142 to computer 102. In step 210, process 200 captures an image from the RGB camera. In one example of step 210, software 106 controls RGB camera 116 to capture RGB image 144 and to send RGB image 144 to computer 102.

In step 212, process 200 processes the RGB image and the IR image to identify and authenticate the object. In one example of step 212, detection algorithm 107 processes RGB image 144 to identify object 150(1) and to determine a location and orientation of the object within virtual environment 120. In another example of step 212, authentication algorithm 108 processes one or both of RGB image 144 and IR image 142 to authenticate object 150(1) as being the object defined by square definition 132(1) based upon the wavelength of detected IR within IR image 142 and visible wavelength within RGB image 144. For example, where the wavelength of detected IR from object 150(1) does not match the defined wavelength within square definition 132(1), or there is no IR detected from the object, then the object is determined as not authentic. In another example, if a color change is not detected between the first and second RGB images 144 (captured in steps 203 and 210, respectively), the object is not authenticated, since fluorescence is not detected.

Step 214 is a decision. If, in step 214, process 200 determines that the object is authenticated, process 200 continues with step 216; otherwise process 200 returns to step 204 to process the next object, or continues with optional step 218 if included or terminates if step 218 is not included.

In step 216, process 200 stores a virtual object within the virtual environment based upon the location and orientation determined in step 210. In one example of step 216, software 106 stores virtual object 122(1) within virtual environment 120, where virtual object 122(1) corresponds to object 150(1) and square definition 132(1) within object list 131.

Upon processing all defined objects within object list 131, process 200 continues with step 220. In step 220, process 200 renders the virtual objects. In one example of step 220, software 106 renders each virtual object 122 stored within virtual environment 120 as rendered objects 170 on display 130 (FIG. 1).

In the example of FIG. 1, coffee mug 152 does not contain IR fluorescing material and is not authenticated by process 200 and is therefore not stored within virtual environment 120. Accordingly, coffee mug 152 is also not rendered on display 130, even though the image of the coffee mug is captured within RGB image 144.

In one embodiment, where each object 150 contains the same IR fluorescing material, IR projector 112 may be activated only during step 206 where IR image 142 is captured and step 204 may be omitted.

In another embodiment, IR image 142 is also used within step 210 for determining position of object 150(1) within virtual environment 120.

In one embodiment, rendering of step 218 utilizes information from both virtual environment 120 and object list 131. For example, the shape and color of object 150(1) as defined within square definition 132(1) may be used together with the location and orientation information stored within virtual object 122(1) to render rendered object 170(1) on display 130. In an alternate embodiment, shape and/or color may be determined from one or both of IR image 142 and RGB image 144, stored within virtual object 122(1), and then used for rendering rendered object 170(1) on display 130.

Figure 4:
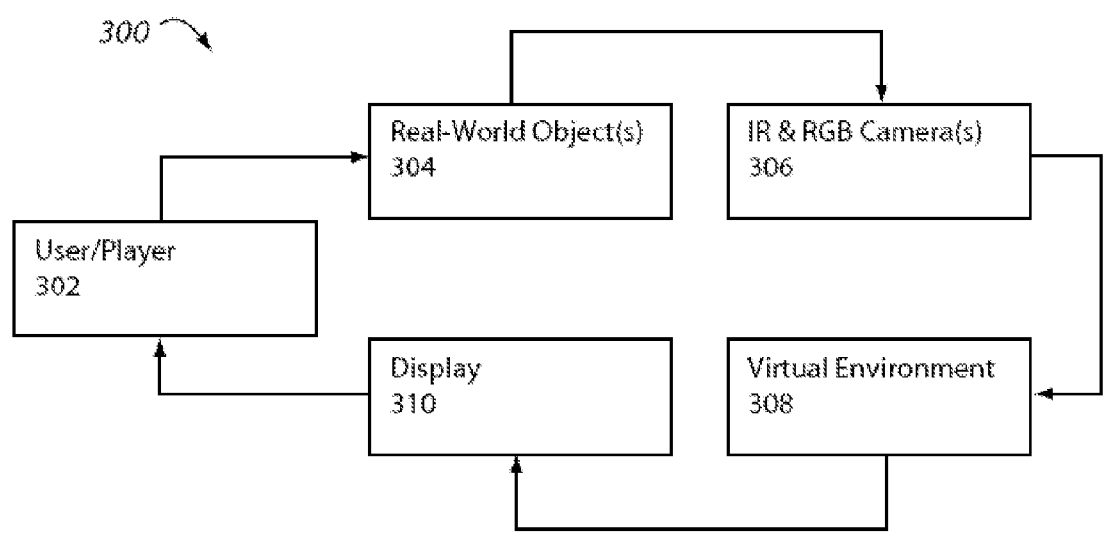
FIG. 4 is a block diagram illustrating exemplary use of the system of FIG. 1 to identify, authenticate, and display objects during interaction with a user, in an embodiment.

FIG. 4 is a block diagram illustrating exemplary use of system 100 to identify, authenticate, and display objects during interaction with a user. A user 302 (e.g., a player of a game, a child being educated by system 100), interacts with real-world object(s) 304 (e.g., objects 150), which are captured in images by IR and RGB cameras 306 (e.g., using IR projector 112, IR camera 114, and RGB camera 116). The images are processed to identify and authenticate the real-world object(s) that create virtual objects (e.g. virtual objects 122) for use within virtual environment 308 (e.g., virtual environment 120). The virtual environment is displayed 310 (e.g., using display 130) to the user wherein the combination of steps 302-310 allow the user to manipulate virtual objects 122 within virtual environment 120 through construction and manipulation of real-world objects 150.

Figure 5:
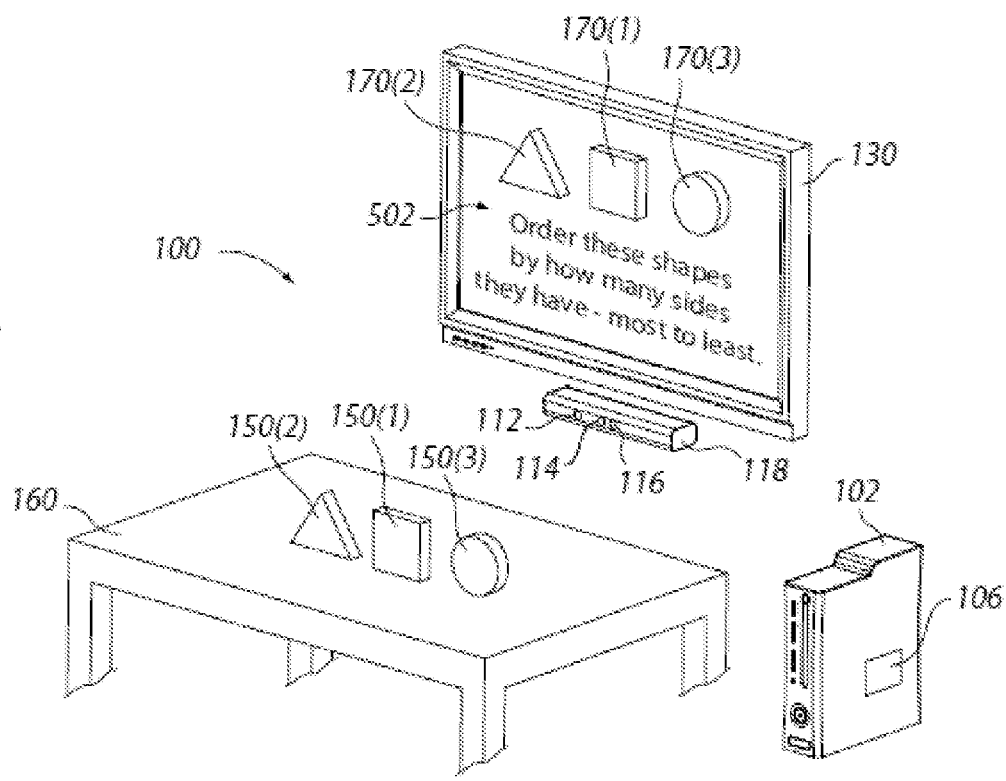
FIG. 5 shows a start position of the system of FIG. 1 used as an educational tool for young children, in an embodiment.
Figure 6:
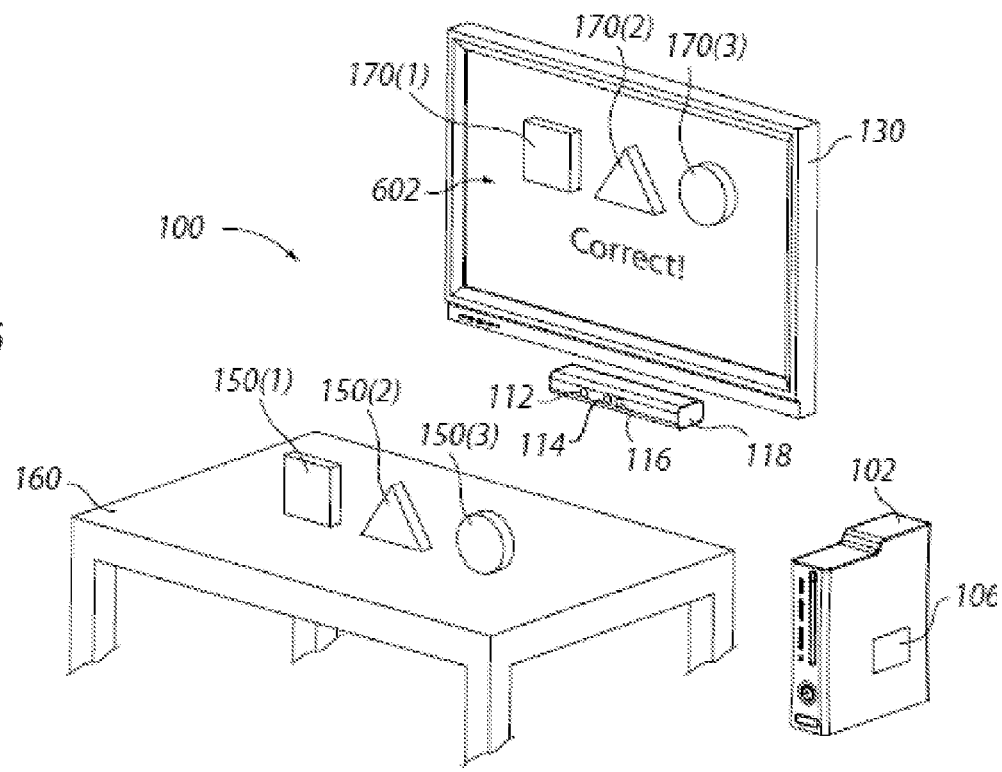
FIG. 6 shows the system of FIG. 1 after a child has completed a task defined by the example of FIG. 5, in an embodiment.

FIG. 5 shows use of system 100 as an educational tool for young children, illustrating a start position. FIG. 6 shows system 100 after a child has completed the task defined by the example of FIG. 5. FIGS. 5 and 6 are best viewed together with the following description.

As shown in FIG. 5, objects 150 are arranged on table 160, and system 100 displays a prompt 502 (or plays an audio prompt) to a user (e.g., a child), indicating that objects 150 should be placed in order based upon the number of sides each object has. As shown in FIG. 6, system 100 detects (e.g., using process 200 of FIG. 2) that objects 150 are correctly ordered and displays a message 602 (or plays an audio sound) indicating that the user has correctly ordered objects 150.

Figure 7:
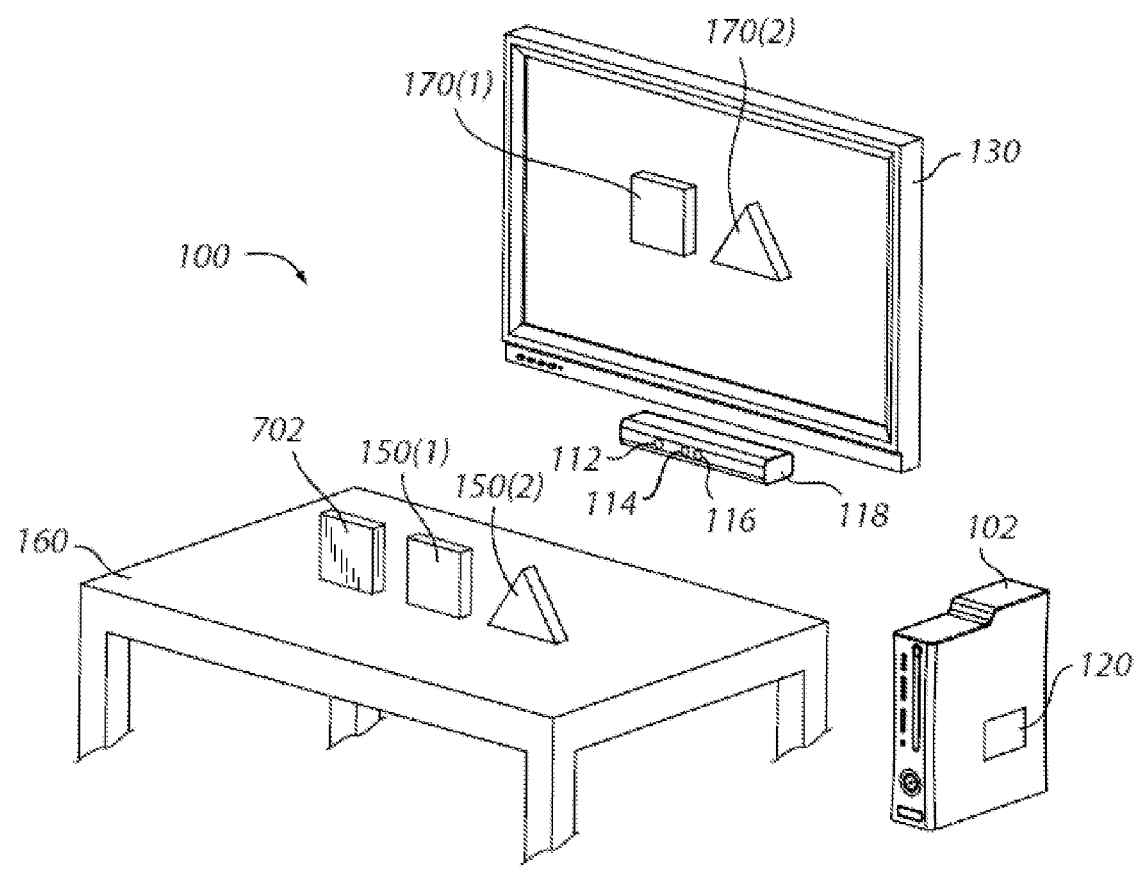
FIG. 7 shows a non-authentic object positioned on the table adjacent to an authenticated object, where the non-authenticated object is not rendered on the display of the system of FIG. 1, in an embodiment.

Through use of IR fluorescent material within objects 150, system 100 is not confused by objects that do not contain the fluorescent material and may verify that the user is using the correct objects for play through authentication. For example, system 100 distinguished between authentic play pieces and similarly shaped, colored, and sized objects, as shown in FIG. 7. In particular, FIG. 7 shows a non-authentic object 702 positioned on table 160 adjacent to object 150(1), but not rendered on display 130 adjacent to rendered object 170(1). Specifically, object 702 does not incorporate an IR material having the defined response (e.g., fluorescing at the appropriate wavelength when excited by IR at a defined wavelength). System 100 may thereby differentiate between proper objects (e.g., play pieces) and non-proper objects. Further, system 100 may differentiate between fluorescing responses of two different fluorescing materials, based upon the wavelength of the exciting IR and the wavelength of the detected IR.

Figure 8:
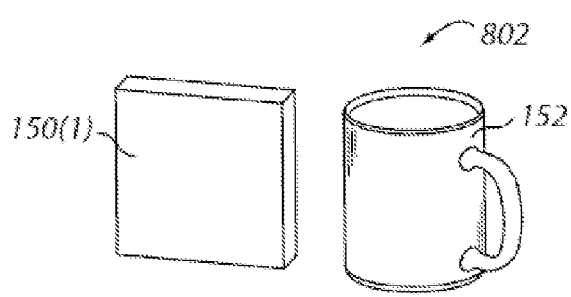
FIG. 8 shows one exemplary RGB image captured by the RGB camera of the system of FIG. 1, without operation of the IR projector, in an embodiment.
Figure 9:
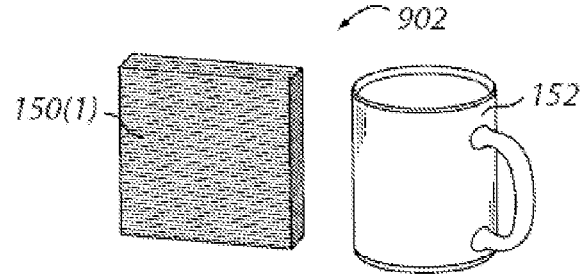
FIG. 9 shows one exemplary RGB image captured by the RGB camera of the system of FIG. 1 during operation of the IR projector, in an embodiment.

FIG. 8 shows one exemplary RGB image 802 (e.g., RGB image 144) captured by RGB camera 116 of system 100, FIG. 1, without operation of IR projector 112. FIG. 9 shows another exemplary RGB image 902 (e.g., RGB image 144) captured by RGB camera 116 with operation of IR projector 112. In particular, square object 150(1) incorporates an IR fluorescing material and coffee mug 152 does not. Object 150(1) appears differently within RGB image 802 as compared to RGB image 902 as a result of fluorescence of the IR florescent material within object 150(1) fluorescing at a wavelength detectable by RGB camera 116. For example, object 150(1) may appear white in image 802 and blue in image 902. In one embodiment, authentication of step 212 of process 200 is performed using RGB camera 116 in combination with operation of IR projector 112.

Figure 10:
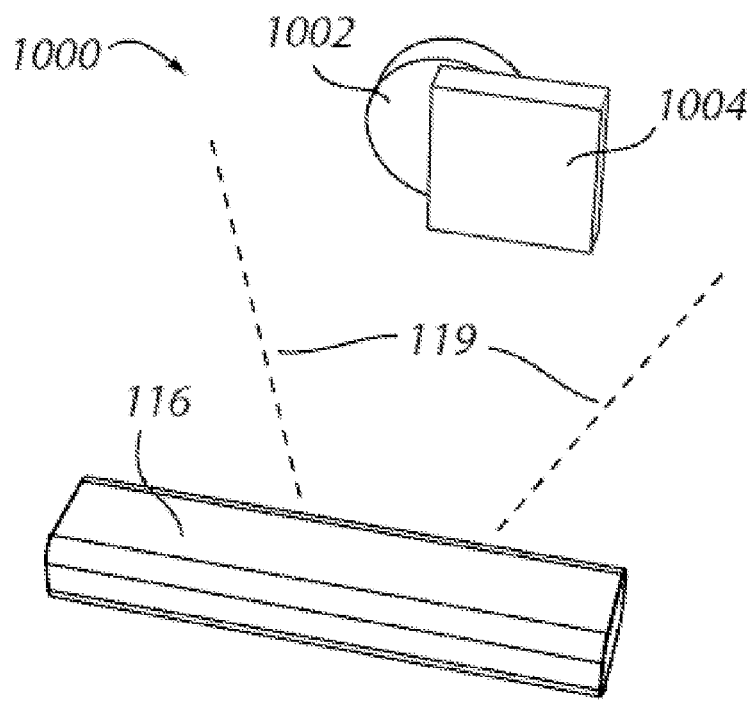
FIG. 10 shows the RGB camera of the system of FIG. 1 capturing an RGB image of two objects without operation of the IR projector, where one object is partially obscured by the other object.
Figure 11:
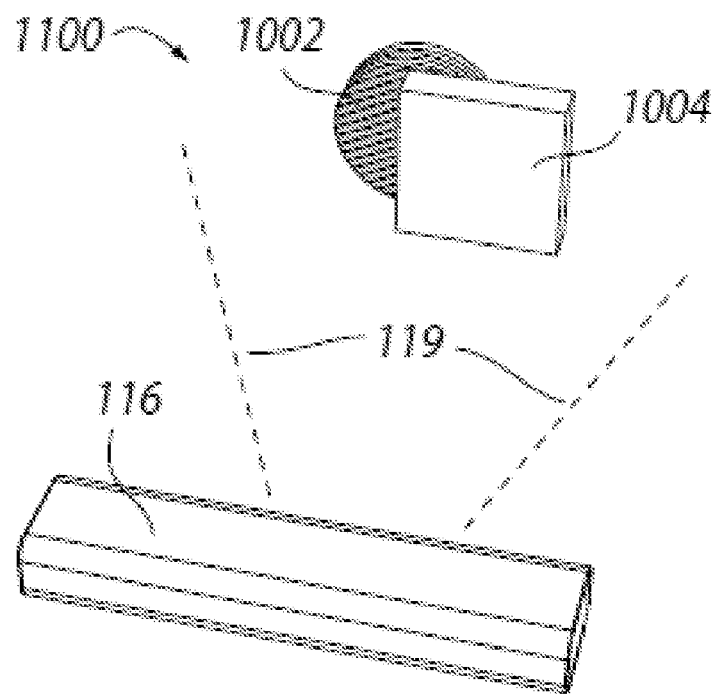
FIG. 11 shows the RGB camera of the system of FIG. 1 capturing an RGB image of the same two objects of FIG. 10 during operation of the IR projector, where the partially obscured object appears a different color as compared with image of FIG. 10.

FIG. 10 shows RGB camera 116 of system 100 capturing an RGB image 1000 of objects 1002 and 1004 within field of view 119, without operation of IR projector 112. Object 1002 is partially obscured by object 1004. Object 1002 has an incorporated IR fluorescent material, and is defined within object list 131. FIG. 11 shows RGB camera 116 of system 100 capturing an RGB image 1100 of objects 1002 and 1004 with operation of IR projector 112, where object 1002 appears a different color as compared with image 1000 of FIG. 10. FIGS. 10 and 11 are best viewed together with the following description. In the following example, the use of fluorescence at a wavelength detectable by RGB camera 116 is described; however, fluorescence at an IR wavelength may similarly be detected and used for identification and authentication by system 100.

As shown in images 1000 and 1100, object 1002 is partially obscured by object 1004 and identification of object 1002 through shape recognition alone becomes less certain. System 100 improves identification of object 1002 through detection and authentication of fluorescence by IR fluorescent material incorporated into object 1002, as compared to a conventional shape recognition device that relies only upon detection of shapes within an image—detection of partially obscured shapes becomes more difficult as the portion of the shape being obscured increases. More particularly, even though object 1002 is partially obscured, it is still identified and authenticated by using algorithm 108, even is only a small portion is visible. System 100 thereby improves object recognition through use of an IR fluorescent material and authentication algorithm 108. In one embodiment, where each object being identified by system 100 fluoresces at a different wavelength (i.e., color), system may identify each objects by fluorescence without evaluation of its shape within the image. That is, system 100 may improve detection of partially obstructed objects (e.g., object 1002) through use of authentication of the associated IR signature, or through identification of an object of interest within an image containing objects that are not of interest, allowing such objects to be ignored.

Figure 12:
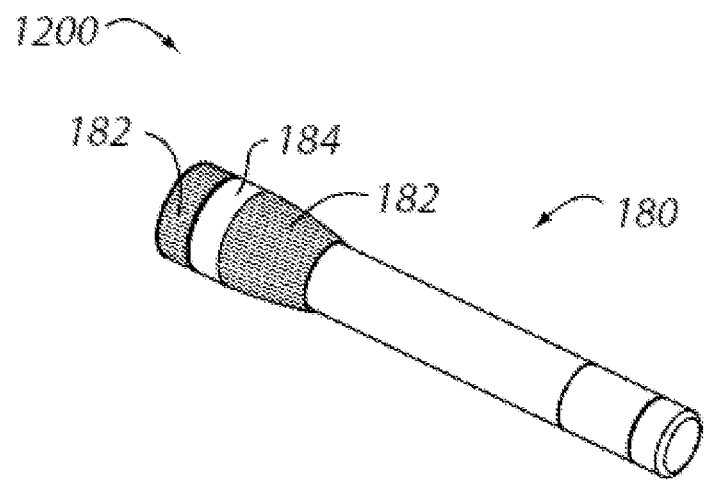
FIG. 12 shows one exemplary RGB image, captured by the RGB camera of the system of FIG. 1 during operation of the IR projector, of a flashlight configured with IR fluorescing material at two locations.

FIG. 12 shows one exemplary RGB image 1200, captured by RGB camera 116 of system 100 of FIG. 1 with operation of IR projector 112, of a flashlight 180 with IR fluorescing material incorporated at locations 182 and 183. By processing RGB image 1200, software 106 may determine orientation of flashlight 180 based upon fluorescence of locations 182 and 183 and non-fluorescence of location 184. In one example of operation, software 106 determines location and orientation of flashlight 180 and creates a corresponding flashlight object in virtual environment 120. Other objects in virtual environment 120 are then rendered as illuminated on display 130 based upon the virtual flashlight, and in particular the determined orientation of flashlight 180.

Figure 13:
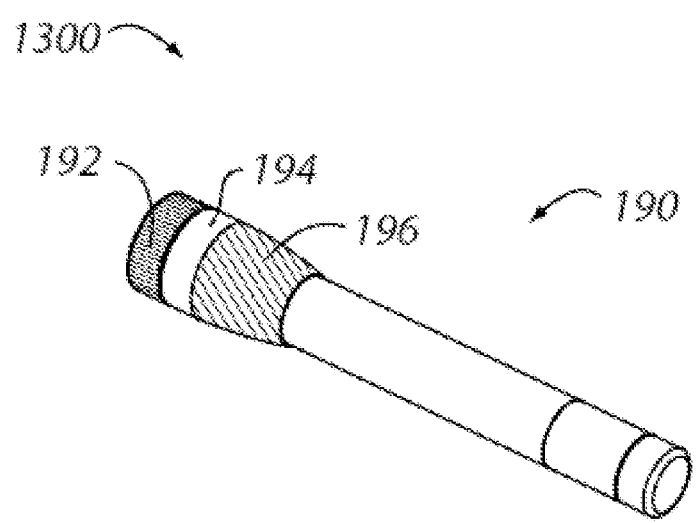
FIG. 13 shows one exemplary RGB image, captured by the RGB camera of the system of FIG. 1 during operation of the IR projector, of a flashlight that has a first IR fluorescing material incorporated at a first location and a second IR fluorescing material incorporated at a second location.

FIG. 13 shows one exemplary RGB image 1300 of a flashlight 190 that has a first IR fluorescing material incorporated at location 192 and a second IR fluorescing material incorporated at location 196. The first IR fluorescing material fluoresces at a different wavelength (or is excited at a different wavelength) that the second IR fluorescing material. Through control of IR projector 112 and use of IR camera 114 and RGB camera 116, software 106 identifies each of the first and second IR fluorescing materials within flashlight 190 during authentication step 212 of process 200, FIG. 3. As with the example of FIG. 12, the use of two fluorescing locations 192 and 196 and the non-fluorescence of location 184 also facilitates determining orientation of flashlight 190. Further, the use of two different IR fluorescing materials increases sophistication of manufacture to help prevent illicit duplication of flashlight 190.

Figure 14:
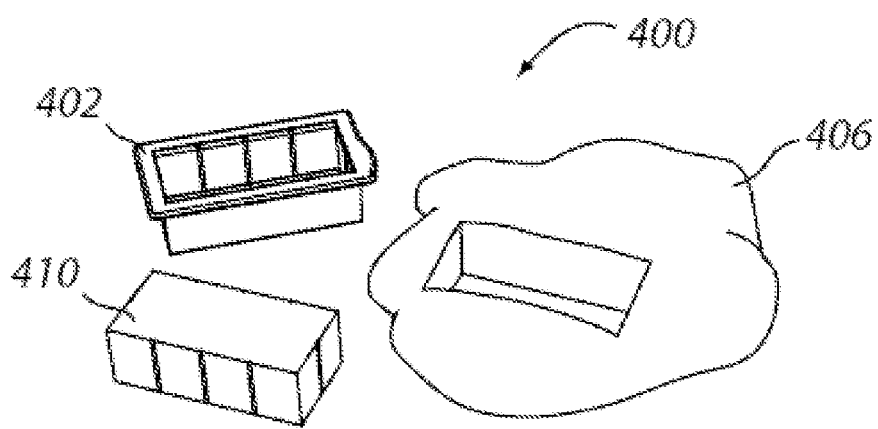
FIG. 14 illustrates one exemplary rectangular object cut by a cookie-cutter styled tool from a malleable compound that holds its form when compressed.
Figure 15:
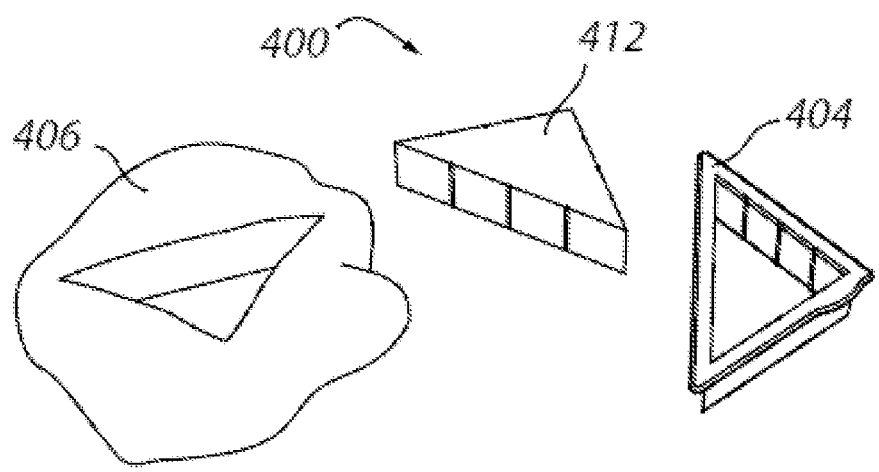
FIG. 15 illustrates one exemplary triangular shaped object cut by a cookie-cutter styled tool from a malleable compound that holds its form when compressed.

FIG. 14 illustrates an object 410 cut from a malleable compound 406 that holds its form when compressed by a cookie-cutter styled tool 402. Similarly, FIG. 15 illustrates a triangular shaped object 412 cut from compound 406 by a cutter tool 404. An IR fluorescing material is incorporated with compound 406 such that compound 406 fluoresces when illuminated by IR projector 112 of system 100, FIG. 1. System 100 may thereby authenticate objects 410 and 412, using authentication algorithm 108, even when the shape of the objects is not predefined.

Figure 16:
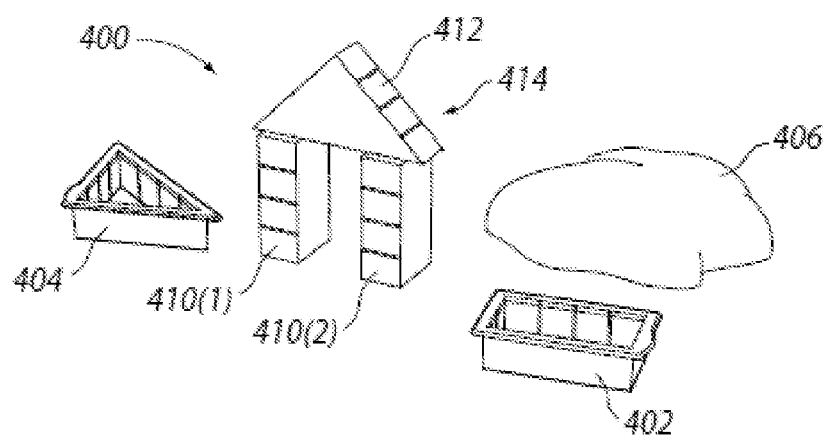
FIG. 16 illustrates exemplary use of the tools of FIGS. 14 and 15 to make a house shape.
Figure 17:
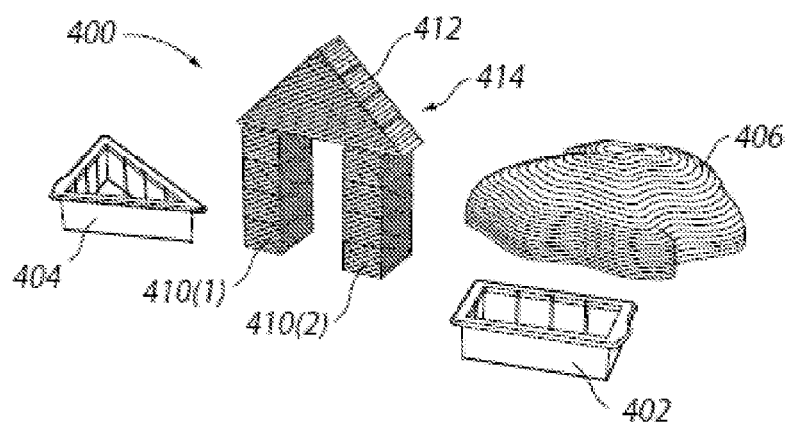
FIG. 17 shows the house shape of FIG. 16 displaying a change in color when illuminated by the IR projector of the system of FIG. 1.

FIG. 16 illustrates exemplary use of tools 402 and 404 to make a house shape 414 by cutting and arranging two rectangular objects 410(1) and 410(2) and triangular object 412 from compound 406. FIG. 17 shows objects 410 and 412 displaying a change in color when illuminated by IR projector 112. System 100 may thereby differentiate between objects 410 and 412 cut from compound 406 and other objects, such as cutter tools 402 and 404.

In one example of operation, system 100 is programmed to recognize complex shapes (e.g., house 414) and operates to authenticate that the complex shape is constructed from compound 406 by measuring fluorescence of IR fluorescing material within the complex shape using IR projector 112 and one or both of IR camera 114 and RGB camera 116. In one embodiment, system 100 allows a user to construct and position complex shapes (e.g., house 414) within virtual environment 120 for display on display 130, for example.

Figure 18:
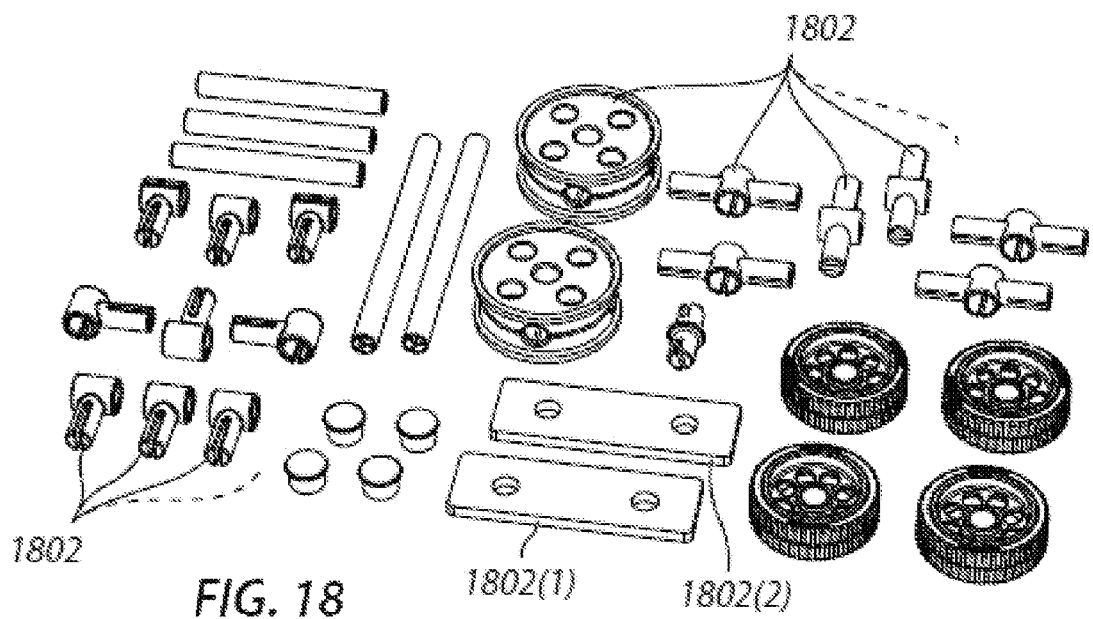
FIG. 18 shows a plurality of components that form part of a play experience using the system of FIG. 1, in an embodiment.

FIG. 18 shows a plurality of components 1802 that form part of a play experience using system 100 of FIG. 1. Components 1802(1) and 1802(2) are configured with a fluorescing material that fluoresces when excited by IR from IR projector 112. Other ones of components 1802 are not configured with the fluorescing material. Components 1802(1) and 1802(2) are selected as key components that facilitate recognition of one or more different models constructed from components 1802.

Figure 19:
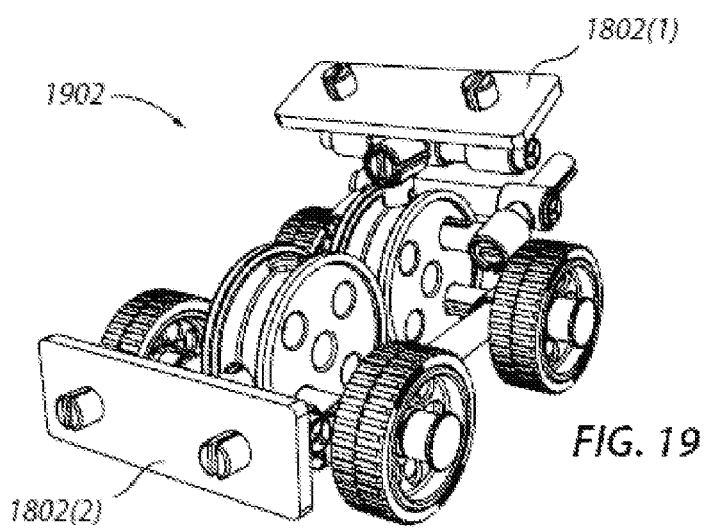
FIG. 19 is a perspective view of one exemplary model constructed from the components of FIG. 18 by a user.

FIG. 19 is a perspective view of one exemplary model 1902 constructed from components 1802 of FIG. 18, including components 1802(1) and 1802(2), by a user. For example, software 106 of system 100 may be preconfigured with one or more models that may be constructed from components 1802, wherein the user is instructed by system 100 to construct a particular model. System 100 may provide instructions for the user to construct the model on display 130, for example. When the user has constructed model 1902, system 100 captures one or more images of model 1902 to identify and authenticate the model.

Figure 20:
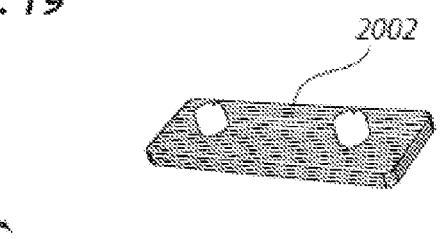
FIG. 20 shows one exemplary IR image of the model of FIG. 19 captured by the IR camera of the system of FIG. 1 during operation of the IR projector.
Figure 20:
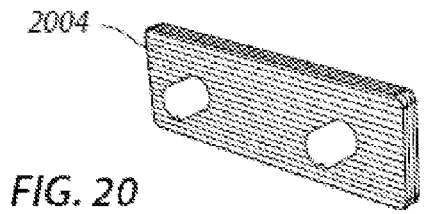

FIG. 20 shows one exemplary IR image 2000 of model 1902, captured by IR camera 114 during operation of IR projector 112, illustrating fluorescence of key components 1802(1) and 1802(2) at a wavelength captured by IR camera 114. From image 2000 (and especially image components 2002 and 2004, which correspond to key components 1802(1) and 1802(2), respectively), software 106 determines that the user has constructed model 1902 and inserts a virtual object (e.g., virtual object 122) representing model 1902 within virtual environment 120. By limiting fluorescence to key components (e.g., components 1802(1) and 1802(2)), identification and authentication of models (e.g., model 1902) constructed from the components is simplified. For example, software 106 may include a predefined relative position of components 1802(1) and 1802(2) for model 1902, and optionally other models, that may be compared to relative positions determined from image 2000 to identify model 1902.

Since only components 1802(1) and 1802(2) are configured with a fluorescing material that fluoresces when excited by IR from IR projector 112, detection algorithm 107 and authentication algorithm 108 require less processing power when executed by processor 103 to identify and authenticate model 1902 as compared to processing all components 1802 within an image of model 1902.

Figure 21:
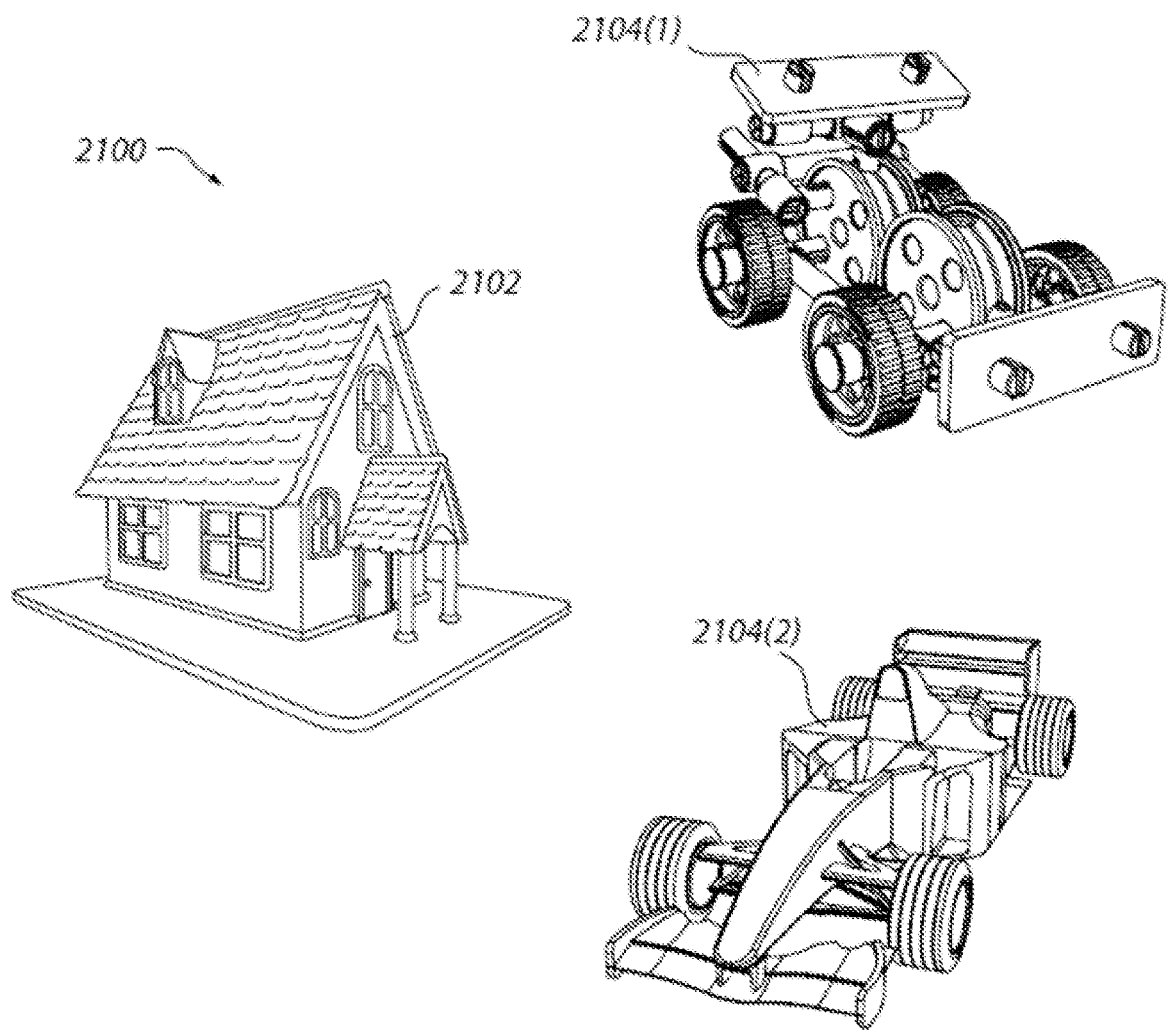
FIG. 21 shows a rendering of the virtual environment of FIG. 1 illustrating a virtual object generated from the house of FIGS. 16 and 17 and a virtual object generated from the model of FIG. 19.

FIG. 21 shows a rendering 2100 of virtual environment 120 (e.g., on display 130) illustrating a virtual object 2102 generated from house 414 of FIGS. 16 and 17 and a virtual object 2104(1) generated from model 1902 of FIG. 19. Virtual object 2104(1) is shown as a digital representation of model 1902 that is recognized from relative positions of key components 1802(1) and 1802(2) within image 2000 as detected by IR camera 114. For example, determining position of image components 2002 and 2004 within image 2000 facilitates identification of model 1902 and position of virtual object 2104(1) within virtual environment 120. Optionally, key components 1802(1) and 1802(2) are authenticated by authentication algorithm 108. Optionally, virtual object 2104(2) is generated from identification of model 1902, wherein virtual object 2104(2) is a representation of a real object (e.g., a racing car) associated with model 1902.

Relative to IR projector 112, IR camera 114, and RGB camera 116 of system 100, the user may manipulate house 414 and model 1904 to position virtual objects 2102 and 2104, respectively, within virtual environment 120. For example, the user may build model 1902 and position virtual object 2104(1) within virtual environment 120, and then build an alternative model (not shown) for positioning within virtual environment 120, thereby constructing complex relationships between recognized shapes and objects.

Figure 22:
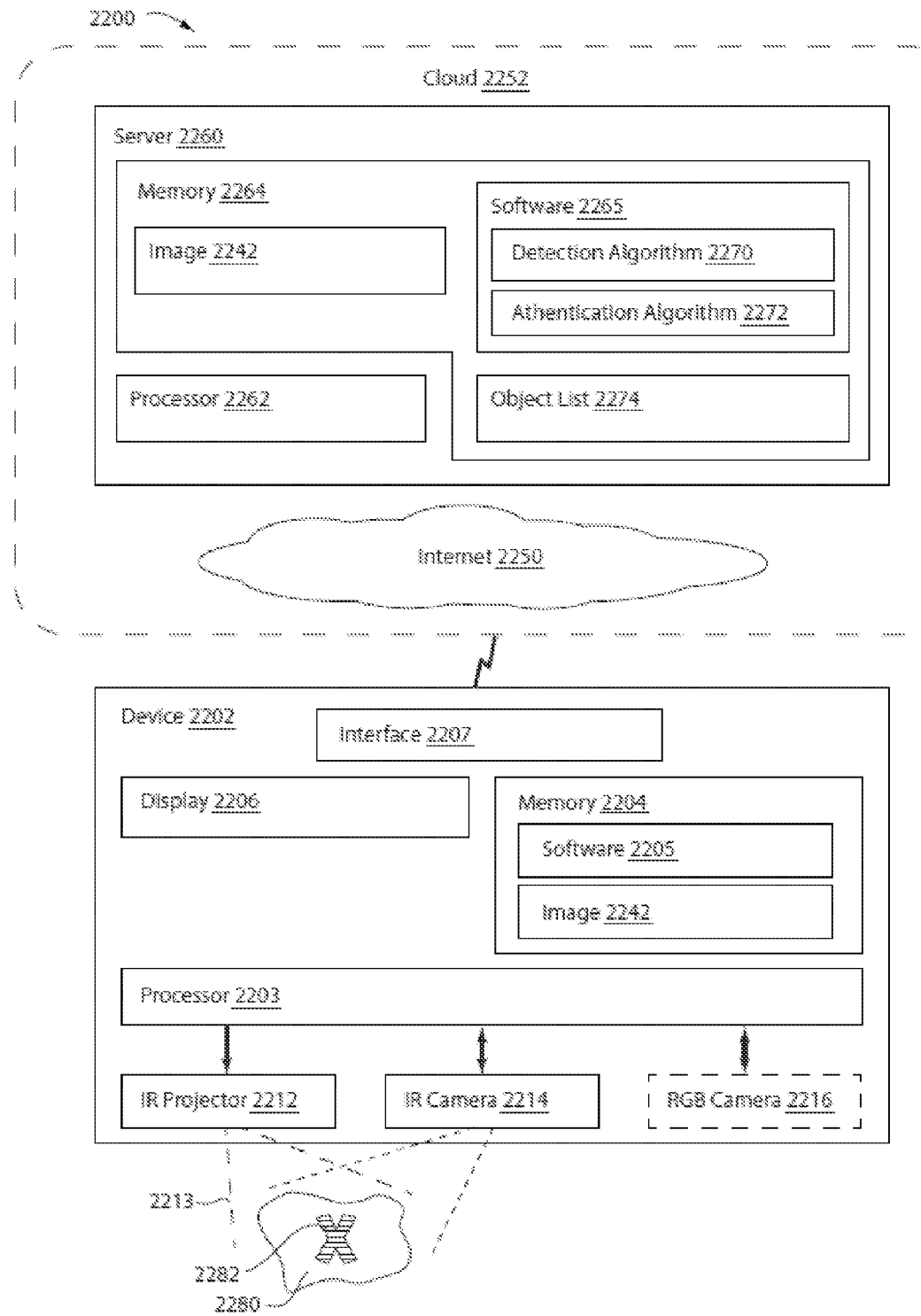
FIG. 22 shows one exemplary system for identifying and authenticating an object using IR, in an embodiment.

FIG. 22 shows one exemplary system 2200 for identifying and authenticating an object using IR. System 2200 includes an authentication device 2202 that communicates wirelessly (e.g., using a transceiver, not shown) with a server 2260, located within the cloud 2252 and accessed via the Internet 2250. Server 2260 and device 2202 may connect on other ways (e.g., wired) or server 2260 may be incorporated into device 2202 without departing from the scope hereof.

Authentication device 2202 is configured with a processor 2203, a memory 2204, an optional display 2206, and IR projector 2212, an IR camera 2214, and optionally an RGB camera 2216. Authentication device 2202 is similar to system 100 of FIG. 2 and is configured with similar functionality. In one embodiment, authentication device 2202 is a smart phone, where IR projector 2212 is implemented within a case of the smart phone.

IR projector 2212, under control of processor 2203 executing machine-readable instructions of software 2205, sends out an IR beam 2213 to excite a fluorescent portion 2282 of an object 2280 that is imaged by IR camera 2214. IR camera 2214 and RGB camera 2216 may be combined within a single camera that captures both IR and visible light. For example, a band-pass filter may be used in front of the imaging sensor of the combined camera to filter out wavelengths that are not of interest (i.e., the band-pass filter would allow wavelengths of IR fluorescence to pass through while blocking other wavelengths). Band-pass filters may also be used with IR camera 2214 to reduce image noise from wavelengths other than those of IR fluorescence.

In one example of operation, IR camera 2214 captures IR image 2242 of object 2280 while fluorescent portion 2282 is illuminated by IR beam 2213 from IR projector 2212. In one embodiment, image 2242 represents a difference between a first image, captured by IR camera 2214 while IR projector 2212 is turned on, and a second image, captured while IR projector 2212 is turned off. That is, image 2242 is formed by subtracting the second image from the first image. Software 2205 operates to identify presence of IR within image 2242 produced in response to IR beam 2213 from IR projector 2212. For example, software 2205 may difference two images, captured by IR camera 2214 to identify IR fluorescence, where one image is captured while IR projector 2212 is activated and another image is captured while IR projector 2212 is inactive. This differencing of images removes background IR from the resultant image 2242.

Figure 23:
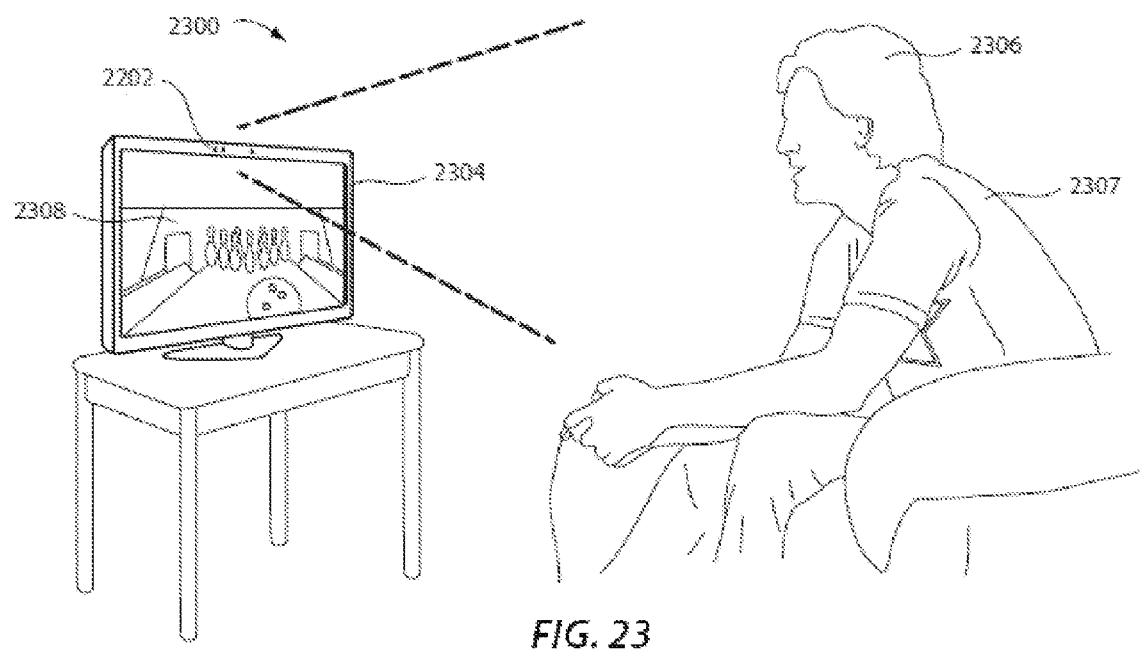
FIG. 23 shows one exemplary scenario where a game player wears a promotional product during play of a game, in an embodiment.

Functionality of authentication device 2202 may be implemented by a computer (e.g., computer 102 of FIG. 2) with external IR projector and IR camera, and may be embedded within other devices (for example see display 2304 of FIG. 23). Authentication device 2202 includes a communication interface 2207 that allows device 2202 to communicate with server 2260, for example via the Internet 2250. In the embodiment shown in FIG. 22, interface 2207 is a wireless transceiver wherein communication between device 2202 and server 2260 is at least in part wireless. For example, interface 2207 may implement one or more of Wi-Fi, Bluetooth, and other wireless protocols. In another embodiment, interface 2207 is a wired interface (e.g., Ethernet) that allows device 2202 to connect to server 2260 through a wired connection.

Server 2260 is for example a computer that includes a processor 2262 and a memory 2264. Memory 2264 is shown storing software 2265 that has machine readable instructions that when executed by processor 2262 implement a detection algorithm 2270 and an authentication algorithm 2272. Detection algorithm 2270 operates to determine a shape of fluorescent portion 2282 within image 2242 and authentication algorithm 2272 operates to authenticate the shape and IR wavelength of fluorescent portion 2282 against objects defined within an object list 2274 that is stored within memory 2264. Object list 2274 defines the shape (e.g., a 3D model of the shape for matching to any viewing angle) and expected IR signature from the object (e.g., a wavelength of expected IR from fluorescent portion 2282). Detection algorithm 2270 and authentication algorithm 2272 cooperate to identify and authenticate object 2280 based upon image 2242 and object list 2274.

In one example of operation, authentication device 2202 captures image 2242 of object 2280 (e.g., a baseball cap having a certain promotional logo containing a fluorescent material) while operating IR projector 2212. Image 2242 is sent, via interface 2207 to server 2260 where detection algorithm 2270 determines a shape of fluorescent portion 2282 within object 2280 based upon image 2242 and object list 2274. Authentication algorithm 2272 authenticates fluorescent portion 2282 based upon IR wavelength information contained within image 2242 and object list 2274. Based upon determined matches within object list 2274, software 2265 identifies and authenticates object 2280, for example as the baseball cap with the certain promotional logo.

Enablement based upon Authenticated Object

In the following examples, technology of system 2200 is licensed for promotional advantage of certain entities. For example, system 2200 (i.e., device 2202 and server 2260) is sold to, or implemented under a license agreement by, an entity involved in promoting one or more products using system 2200. However, server 2260 of system 2200 may also be provided as a service, wherein other entities purchase, license, and/or lease device 2202 that communicated with server 2260 to identify and authenticate promotional products, wherein a transaction charge is levied for each object that is identified and authenticated by server 2260.

Figure 24:
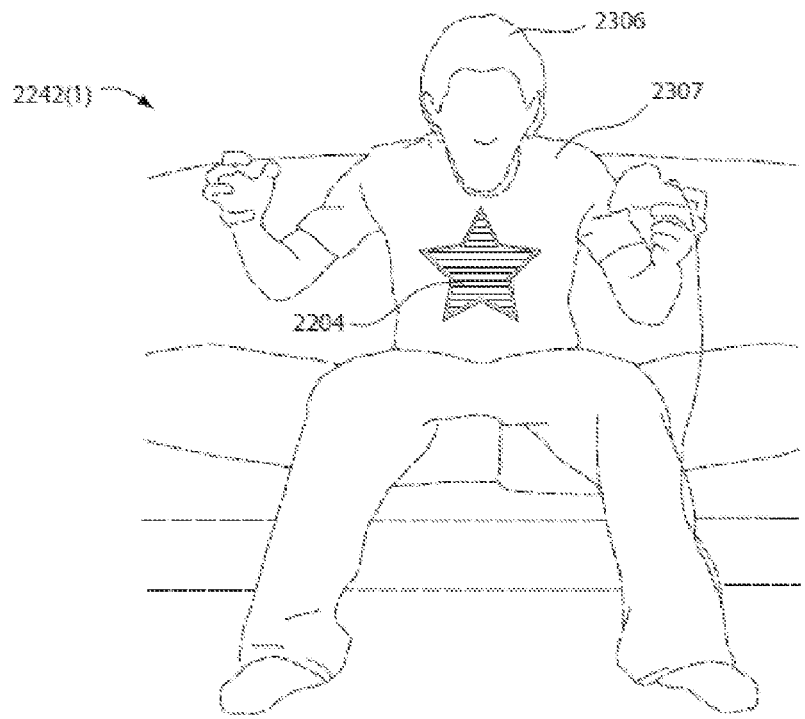
FIG. 24 shows one exemplary IR image, captured by the authentication device of FIG. 22, during the scenario of FIG. 23.

FIG. 23 shows one exemplary scenario 2300 where a game player 2306 plays a game 2308 on a screen 2304. Screen 2304 is for example a screen of a computer system or a television coupled to a game box (not shown). In this example, screen 2304 is configured with authentication device 2202 of FIG. 22. That is, device 2202 is embedded within screen 2304. Device 2202 may be separate from screen 2304 or contained in other devices without departing from the scope hereof. FIG. 24 shows one exemplary image 2242(1) captured by authentication device 2202 of player 2306 playing the game while wearing a promotional t-shirt 2307 configured with a shape 2402 containing a fluorescent material (e.g., the fluorescent material is within ink that is screen printed onto t-shirt 2307 and/or the fluorescent material is contained within threads woven into or that are part of t-shirt 2307). Game 2308 has locked functionality (e.g., a particular feature or an area of game play that is not normally available to the player or not yet included—see locked functionality 2509 of FIG. 25) that becomes available to player 2306 only when authentication device 2202 identifies and authenticates shape 2402. That is, the particular features only become available to player 2306 when T-shirt 2307 is identified and authenticated by system 2200. That is, object list 2274 contains shape and expected IR information of shape 2402, and when shape 2402 is identified and authenticated within server 2260, a signal (e.g., a message) is sent to device 2202 for communication to game 2308. Alternatively, server 2260 may communicate identification and authentication of shape 2402 directly with game 2308 (e.g., particularly where game 2308 is Internet based).

In another example, game play of game 2308 is enhanced when device 2202 identifies and authenticates shape 2402. T-shirt 2307 is for example sold separately from game 2308, but is promoted by game 2308. Thus, system 2200 provides a strong promotional vehicle for selling T-shirt 2307. Although the example of FIGS. 23 and 24 illustrate promotion of T-shirt 2307, system 2200 may promote other objects (e.g., jackets, hats, gloves, implements, toys, food products, candy, etc.) without departing from the scope hereof.

In one embodiment, the "locked" functionality is omitted from game 2308 and is downloaded, via the Internet for example, when T-shirt 2307 is authenticated.

Figure 25:
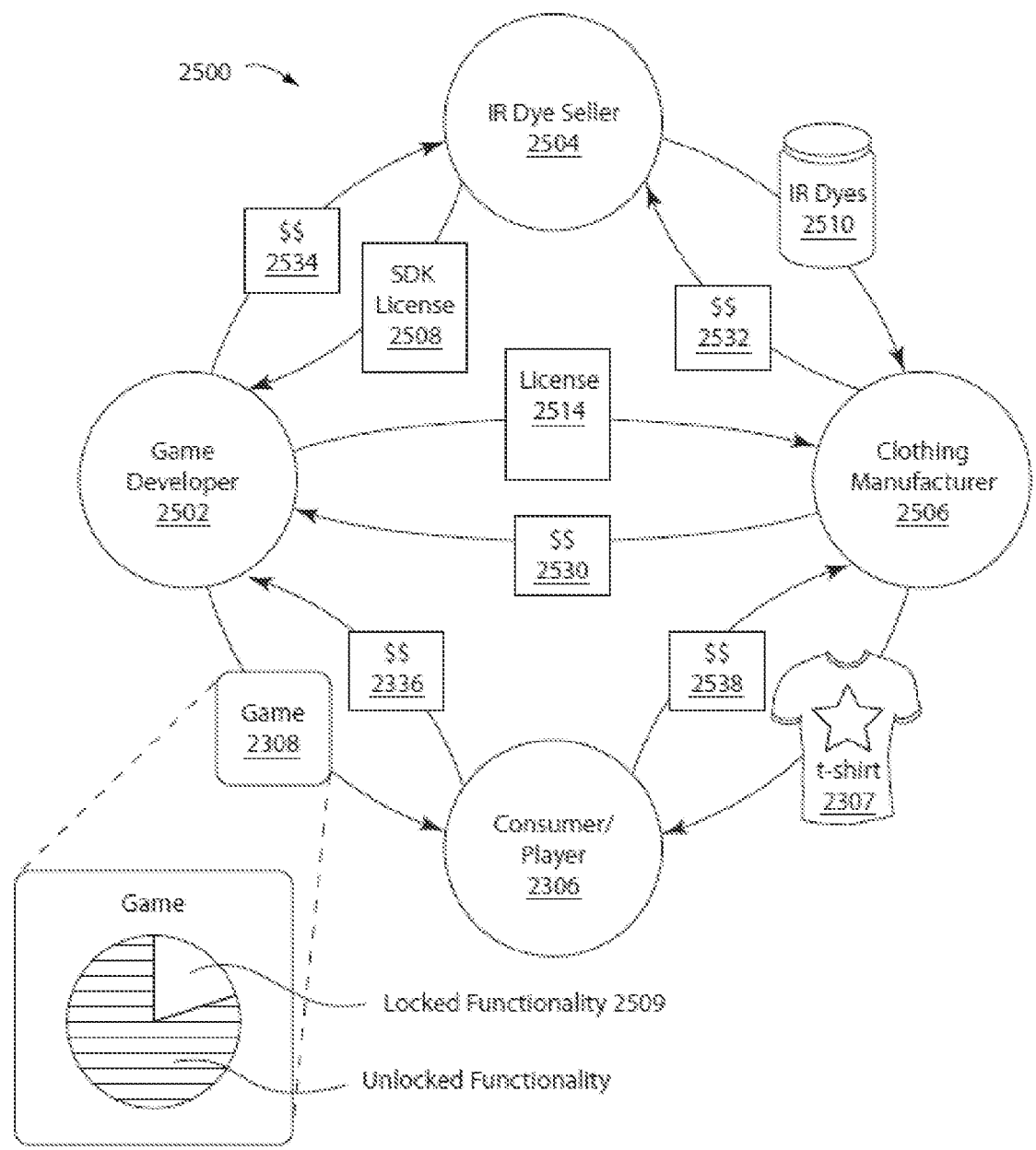
FIG. 25 is a flow diagram illustrating exemplary transactions between a game developer, an IR dye seller, and a clothing manufacturer, in an embodiment.

FIG. 25 is a flow diagram 2500 illustrating exemplary transactions between a game developer 2502, an IR dye seller 2504, and a clothing manufacturer 2506. Game developer 2502 is the developer of game 2308 of FIG. 23, for example. IR dye seller 2504 implements system 2200 of FIG. 22 and provides, based upon a software development kit (SDK) license 2508, an SDK to game developer 2502 for integration/configuration of game 2308 with system 2200.

Game developer 2502 enters into an agreement based upon a license 2514 with clothing manufacturer 2506 to produce promoted product (T-shirt) 2307. IR dye seller 2504 sells IR dyes 2510 to clothing manufacturer 2506 for incorporation into promoted product 2307. Game developer 2502 sells game 2308 to consumer/player 2306, indicating that locked functionality 2509 of game 2308 is unlocked if player 2306 has product 2307. Thus, player 2306 has an incentive to buy product 2307 from clothing manufacturer 2506 to unlock locked functionality 2509 of game 2308.

Game developer 2502 receives a payment 2530 from clothing manufacturer 2506 for each product sold and/or for the right of clothing manufacturer 2506 to manufacture product 2307. IR dye seller 2504 receives a payment 2532 from clothing manufacturer 2506 for purchase of IR dyes 2510 needed to manufacture product 2307, and a payment 2534 from game developer 2502 for SDK license 2508, and/or for sales of game 2308. Game developer 2502 receives a payment 2536 from consumer/player 2306 for game 2308. Clothing manufacturer 2506 receives a payment 2538 from consumer/player 2306 for product 2307. Thus, system 2200 allows a product to be promoted by, and additional interest to be created for, game 2308. System 2200 and the use of IR dyes 2510 prevent unauthorized production of product 2307, since conventional inks and dyes would not contain the appropriate IR fluorescence when irradiated by beam 2213 of IR projector 2212, and would therefore not unlock locked functionality 2509 of game 2308.

Further, since product 2307 is identified and authenticated in real-time with game play of game 2308, sharing of product 2307 is also mitigated. Where game 2308 is a multi-player game, one product 2307 is for example needed for each player to unlock locked functionality 2509.

Figure 26:
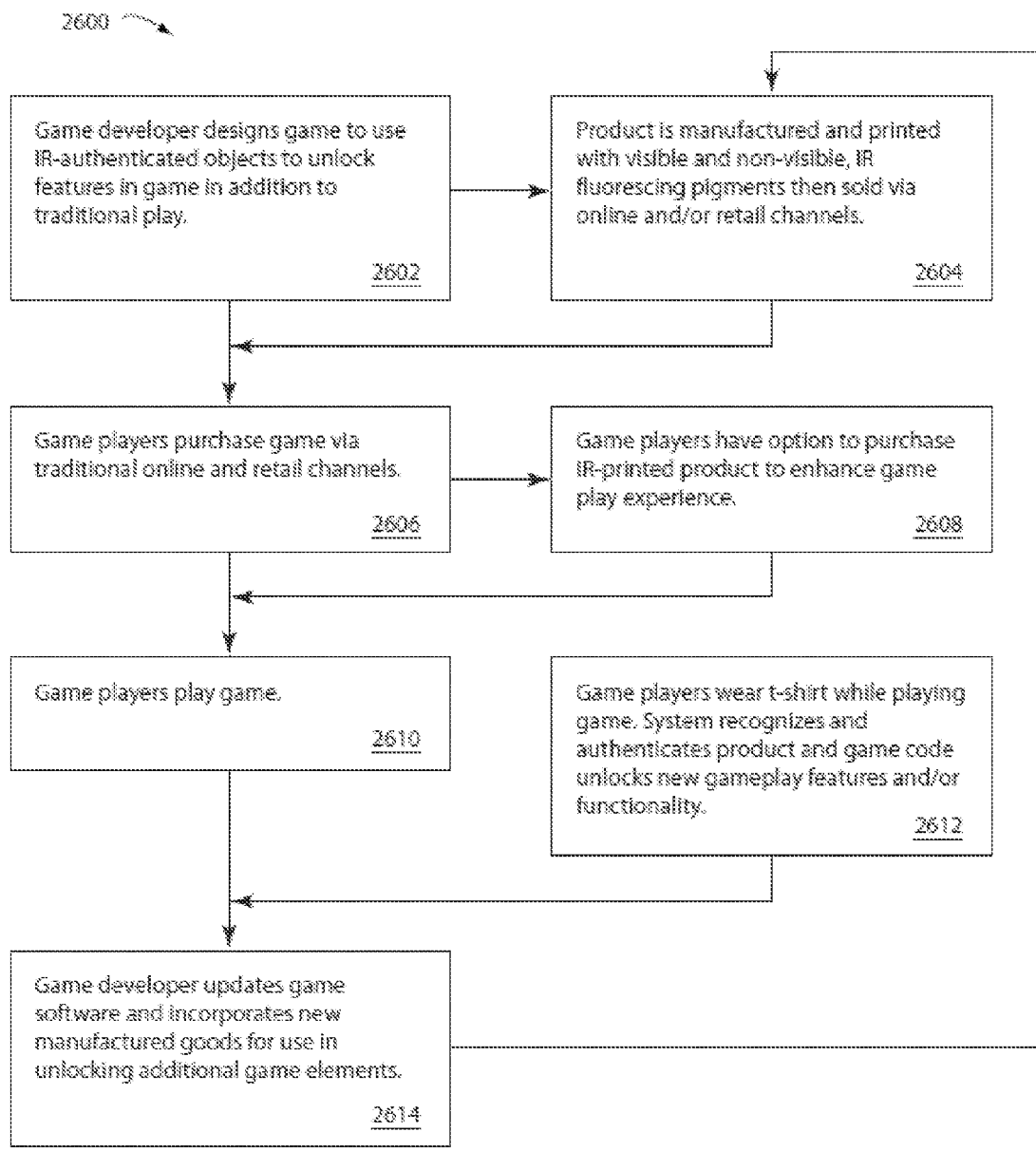
FIG. 26 is a flowchart illustrating exemplary involvement of entities for development, sale, and use of the game and product of FIG. 23, in an embodiment.

FIG. 26 is a flowchart 2600 illustrating exemplary involvement of entities 2502, 2504, 2506, and 2306 for development, sale, and use of game 2308 and product 2307. In step 2602 of method 2600, game developer 2502 designs game 2308 to use an IR-authenticated object 2307 to unlock locked functionality 2509 of game 2308 in addition to traditional game play. In step 2604 of method 2600, clothing manufacturer 2506 prints manufactured product 2307 with visible and non-visible IR fluorescing pigments and then sells product 2307 online and/or through retail channels. In step 2606 of method 2600, player 2306 purchases or updates game 2308 via traditional online and/or retail channels. In step 2608 of method 2600, player 2306 purchases IR-printed T-shirt 2307 to enhance the game play experience of game 2308. In step 2610 of method 2600, player 2306 plays game 2308. In step 2612 of method 2600, player 2306 wears T-shirt 2307 while playing game 2308. System 2200 identifies and authenticates T-shirt 2307 and unlocks locked functionality 2509 of game 2308.

In step 2614 of method 2600, game developer 2502 updates game 2308 with additional functionality, or which at least a portion is locked, and incorporates new manufactured for use in unlocking the locked additional functionality.

Figure 27:
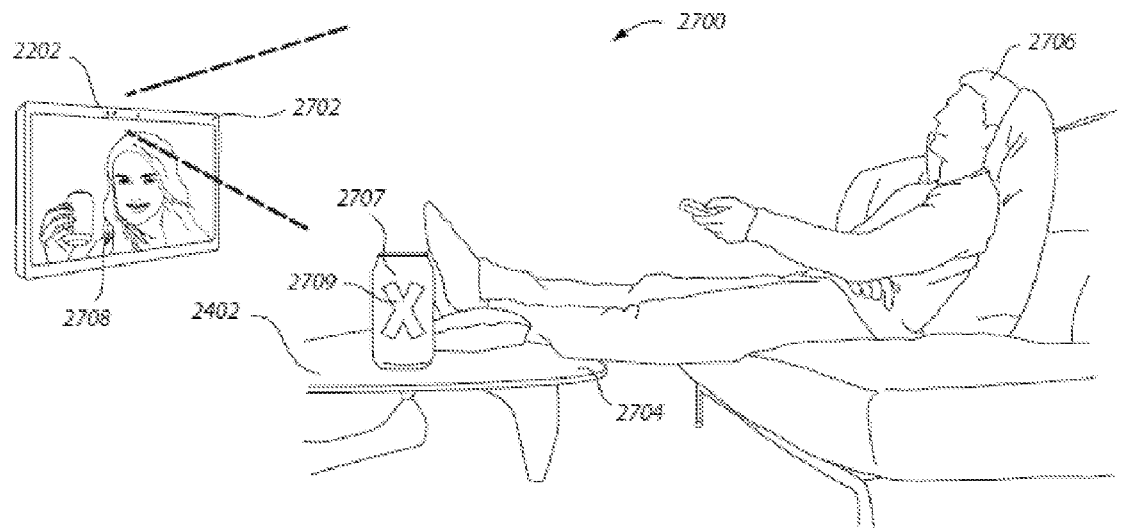
FIG. 27 shows one exemplary scenario where a consumer is watching an advertisement on a television, in an embodiment.

FIG. 27 shows one exemplary scenario where a consumer 2706 is watching a television 2702. Television 2702 is configured with device 2202, of FIG. 22, that is in communication with server 2260. In one embodiment, viewer 2706 registers device 2202 with server 2260 using personal identification (e.g., an email address of viewer 2706). Viewer 2706 has a product 2707 standing on a table 2704 and within view of device 2202. Product 2707 has a printed logo 2709 that appears "normal" in visible light, and that includes one or more IR pigments that fluoresce upon incident IR from IR projector 2212.

Figure 28:
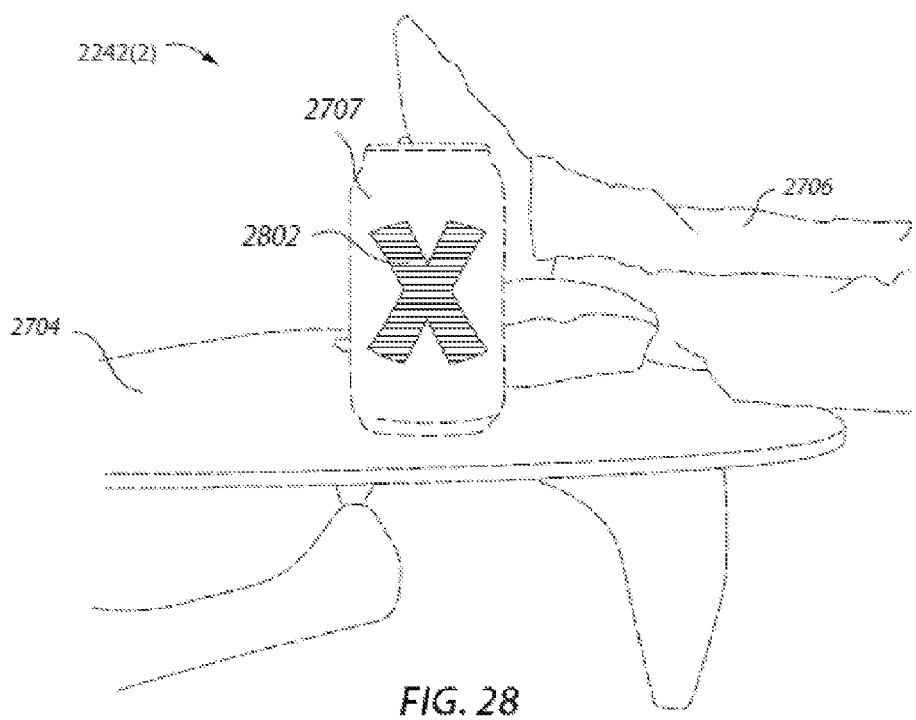
FIG. 28 shows one exemplary IR image captured by the authentication device of FIG. 22 during the scenario of FIG. 27.

During display of certain advertisements 2708 (e.g., an advertisement for product 2702) on television 2702, device 2202 is triggered by server 2260 and/or television 2702, wherein IR projector 2212 is activated and one or more IR images 2242 are captured and sent to server 2260. FIG. 28 shows one exemplary IR image 2242(2) captured by device 2202 during advertisement 2708. Server 2260 processes IR image 2242 to identify and authenticate product 2707 based upon IR fluorescence of logo 2709 captured within IR image 2242(2).

Figure 29:
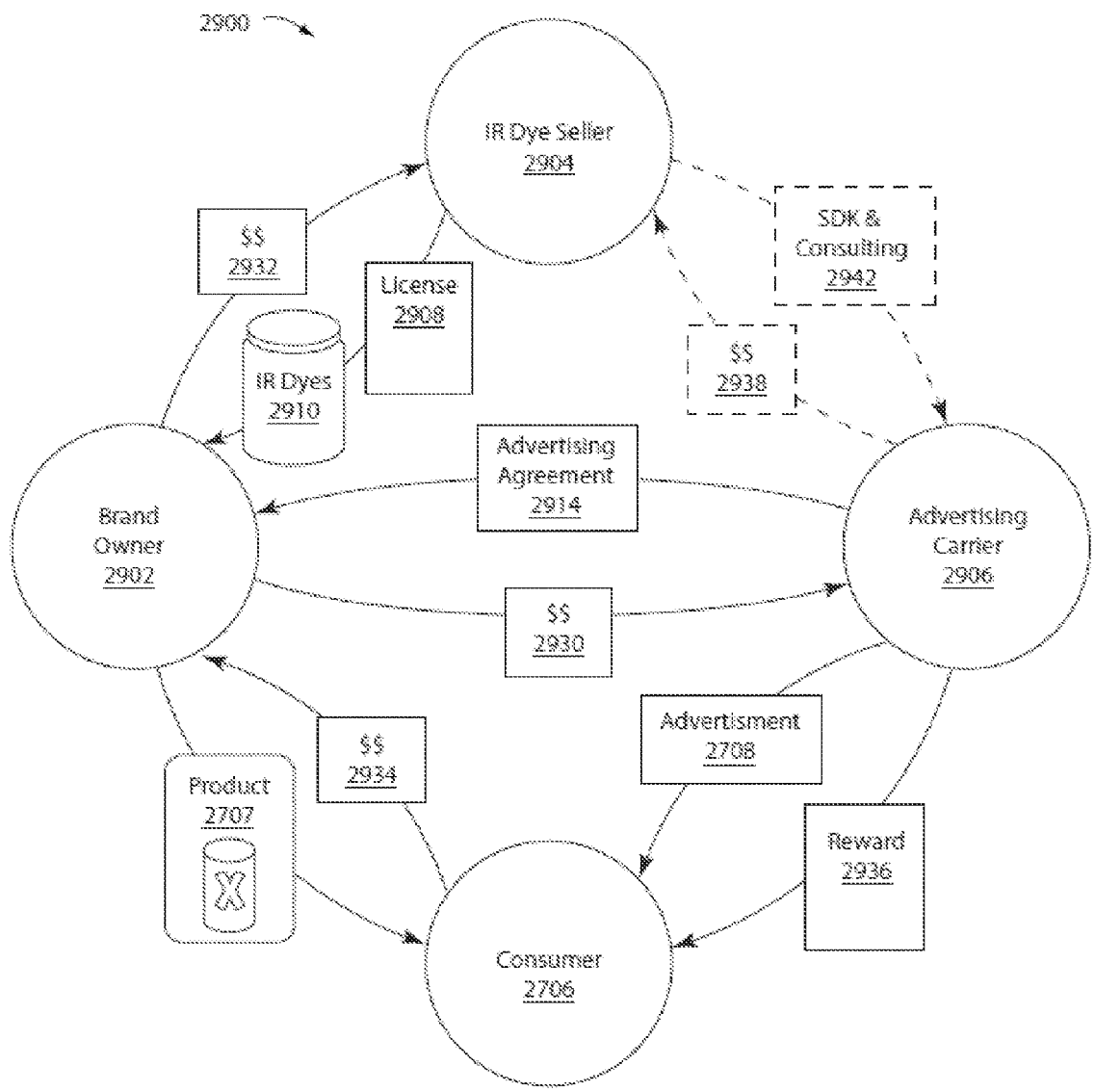
FIG. 29 is a flow diagram illustrating exemplary transactions between a brand owner, an IR dye seller, an advertisement carrier, and the consumer/viewer of FIG. 27.

FIG. 29 is a flow diagram 2900 illustrating exemplary transactions between a brand owner 2902, an IR dye seller 2904, an advertisement carrier 2906, and a consumer/viewer 2706. Brand owner 2902 purchases IR dyes 2910 and a license 2908 from IR dye seller 2904 and incorporates IR dyes 2910 within product 2707 (manufactured for or by brand owner 2902). Brand owner 2902 also forms an advertising agreement 2914 with advertising carrier 2906 to carry advertisement 2708 for product 2707.

IR dye seller receives a payment 2932 from brand owner 2902 for IR dyes 2910 and for license 2908 (e.g., based upon the number of products 2707 produced and/or advertisements 2708 displayed and/or viewed). Advertising carrier 2906 receives a payment 2930 from brand owner 2902 for carrying advertisement 2708. Brand owner 2902 receives a payment 2934 from consumer/viewer 2706 for purchase of product 2707. Optionally, advertizing carrier 2906 uses a SDK (and optionally consulting) 2942 from IR dye seller 2904 to facilitate interfacing between server 2260 and computers of advertizing carrier 2906, for which IR dye seller 2904 receives a payment 2938 from advertizing carrier 2906.

Continuing with the example of FIGS. 27 and 28, when server 2260 detects product 2702 during display of advertisement 2708, advertising carrier 2906 receives a notification from server 2260, wherein advertising carrier 2906 generates a reward 2936 (e.g., a coupon for product 2707, points for accumulation by consumer 2706, money, or other reward) for consumer 2706. In an alternative embodiment, server 2260 notifies brand owner 2902 when product 2707 is identified and authenticated in association with consumer 2706, wherein brand owner 2902 sends reward 2936 to consumer 2706 (e.g., using the registered email address of consumer 2706). In another embodiment, one or both of brand owner 2902 and advertising carrier 2906 implement an awards scheme, wherein upon notification of identified product 2707, points are added to a points count associated with consumer 2706.

Figure 30:
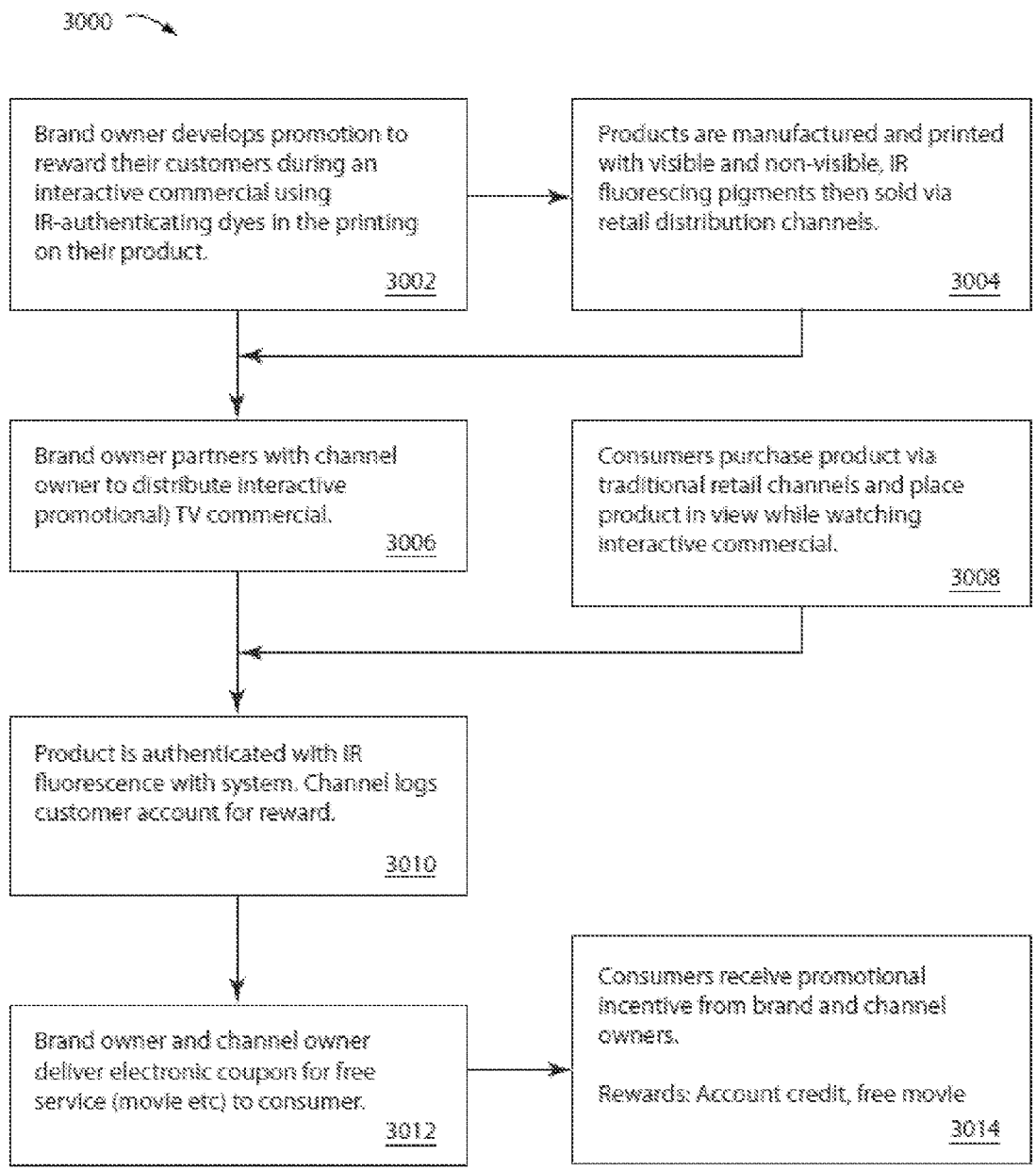
FIG. 30 is a flowchart illustrating exemplary involvement of entities for promoting, advertising and rewarding purchase of a product, in an embodiment.

FIG. 30 is a flowchart 3000 illustrating exemplary involvement of entities 2902, 2904, and 2906 for promoting, advertising and rewarding purchase of product 2707. In step 3002, brand owner develops promotion to reward their customers during an interactive commercial using IR authenticating dyes in the printing on their product. In step 3004, products are manufactured and printed with visible and non-visible IR fluorescing pigments and then sold via retail distribution channels. In step 3006, brand owner 2902 partners with advertizing carrier 2906 to distribute/play interactive promotional advertisement 2708. In step 3008, consumer 2706 purchases product 2707 via traditional retail channels and places product 2707 in view of device 2202 while watching interactive advertisement 2708. In step 3010, system 2200 authenticates product 2707 using IR fluorescence and notifies one or both of brand owner 2902 and advertising carrier 2906 of the authenticated product 2707. In step 3012, brand owner 2902 and/or advertising carrier 2906 sends reward 2936 (e.g., an electronic coupon for free service, movie, or other promotion) to consumer 2706. In step 3014, consumer 2706 receives reward 2936 from one or both of brand owner 2902 and advertising carrier 2906.

Figure 31:
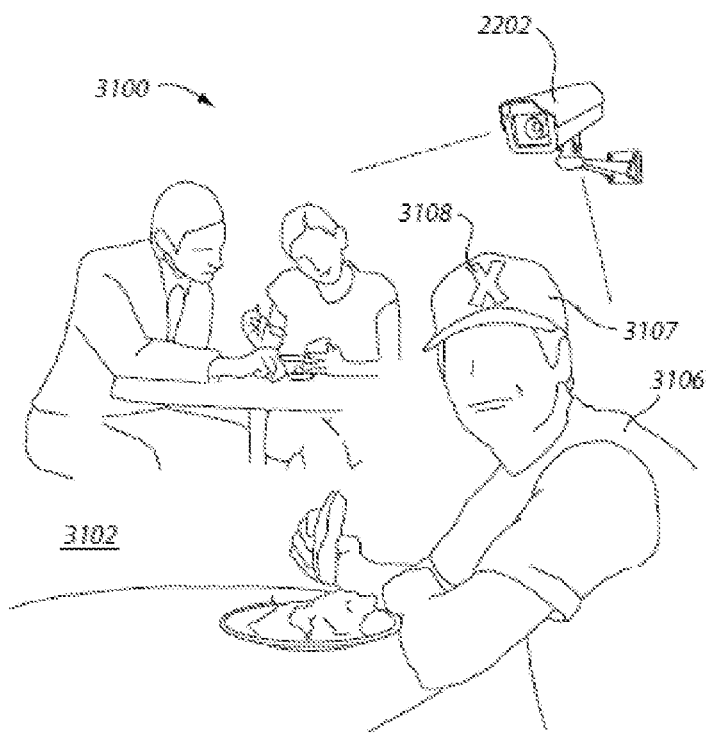
FIG. 31 shows one exemplary scenario where a consumer is wearing a promotional product at a venue, in an embodiment.
Figure 32:
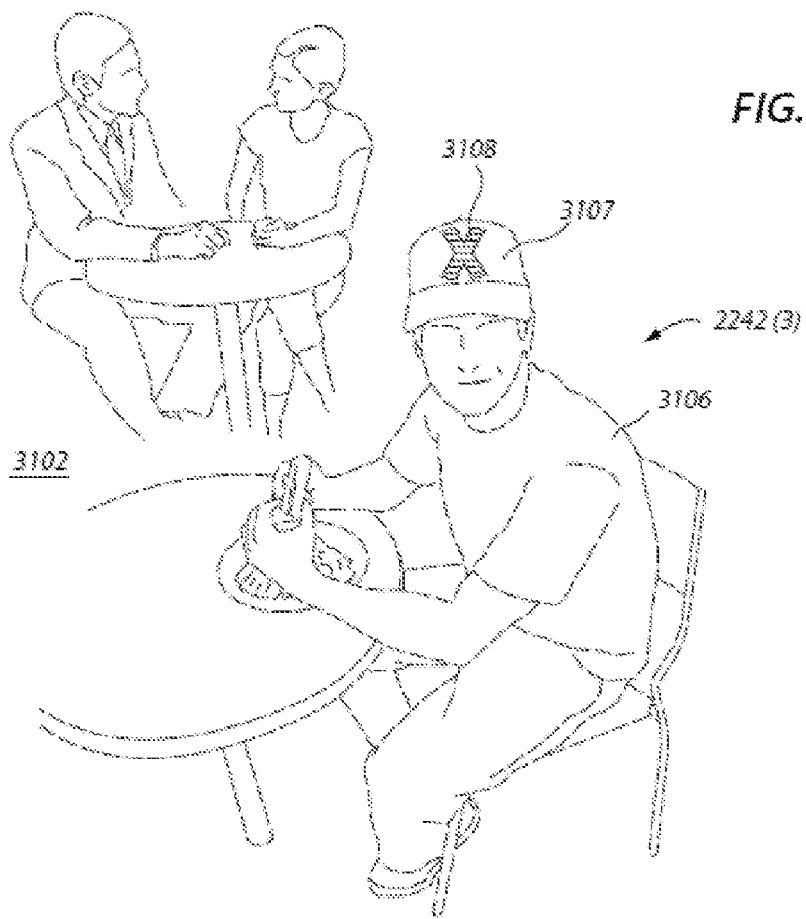
FIG. 32 shows one exemplary IR image, captured by the authentication device of FIG. 22, of the scenario of FIG. 31.

FIG. 31 shows one exemplary scenario 3100 where a consumer 3106 is located at venue 3102 (e.g., consumer 3106 is eating at a restaurant) while wearing a promotional product 3107 (a baseball cap in this example). Product 3107 has a visible logo 3108 that also includes one or more IR fluorescing dye pigments (e.g., within the ink of a printed logo or within yarn of an embroidered logo). Venue 3102 has at least one authentication device 2202 (e.g., installed at an entrance way to image consumers entering the venue and/or installed with a view of the venue) that is in communication with server 2260. FIG. 32 shows one exemplary IR image 2242(3), captured by authentication device 2202 at venue 3102, showing fluorescence of logo 3108. Authentication device 2202 communicates with server 2260 to authenticate product 3107 based upon fluorescence of dyes within product 3107 captured within IR image 2242(3).

Figure 33:
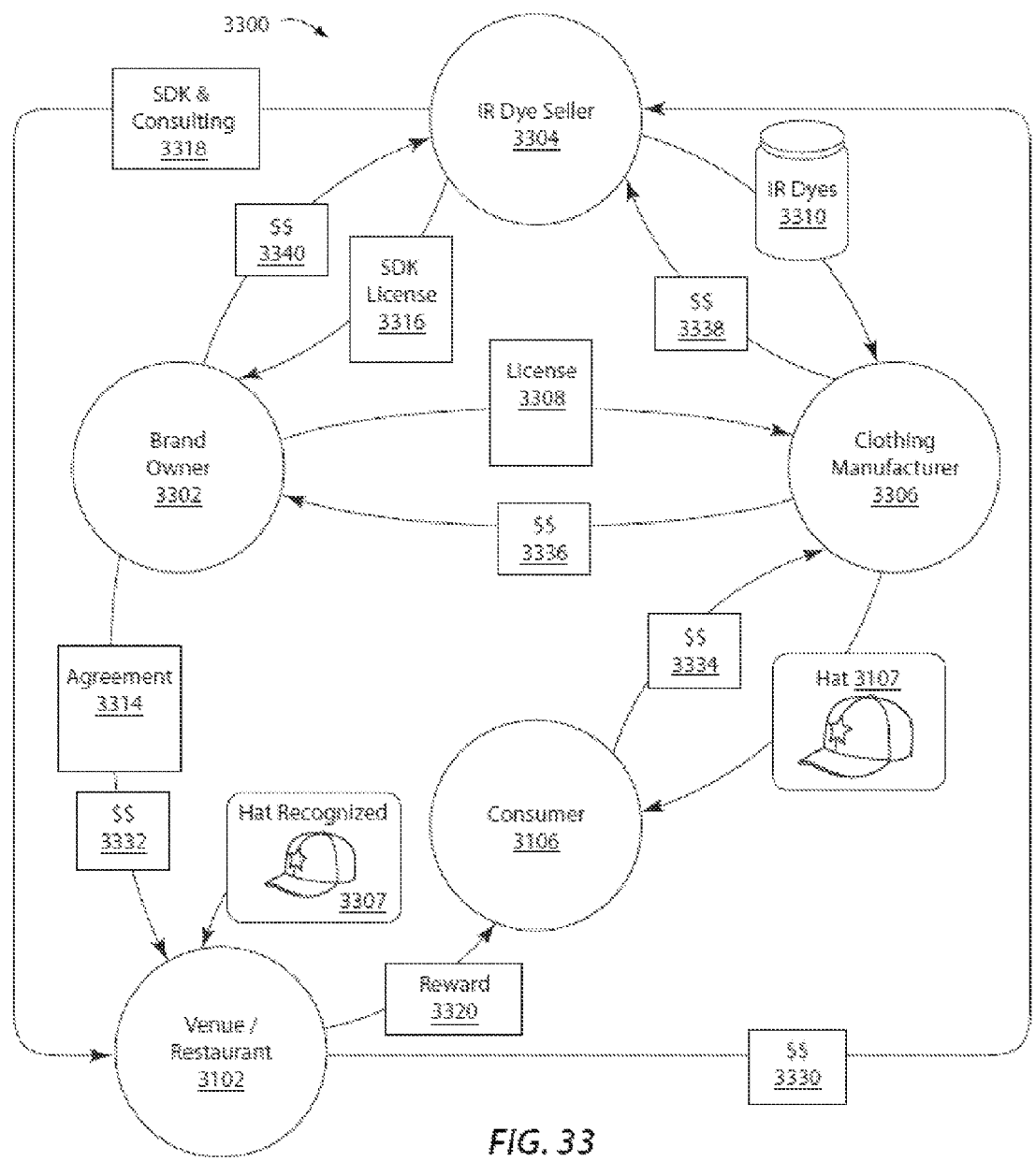
FIG. 33 is a flow diagram illustrating exemplary transactions between a brand owner, an IR dye seller and a clothing manufacturer, during the scenario of FIG. 31.

FIG. 33 is a flow diagram 3300 illustrating exemplary transactions between a brand owner 3302, an IR dye seller 3304, a clothing manufacturer 3306, a venue 3102 and a consumer 3106. Brand owner 3302 licenses 3308 clothing manufacturer 3306 to manufacture product 3107. Clothing manufacturer 3306 purchases IR dyes 3310, from IR dye seller 3304, and incorporates IR dyes 3310 within product 3107. Brand owner 3302 also forms an agreement 3314 with venue 3102 to have venue 3102 associated with a promotion based upon product 3107. Brand owner 3302 and venue 3102, collectively or individually, purchase a SDK license 3316 and SDK and consulting services 3318 from IR dye seller 3304 for operation of authentication device 2202 at venue 3102 to automatically authenticate product 3107 at venue 3102.

Product 3107 is for example sold at a premium price by clothing manufacturer 3306 to consumer 3106 based upon the promotion by brand owner 3302 and venue 3102. For example, agreement 3314 between brand owner 3302 and venue 3102 may provide a reward 3320 at venue 3102 when product 3107 is authenticated. Therefore, consumer 3106 is willing to pay the premium price for product 3107 to receive reward 3320 when frequenting venue 3102. For example, where venue 3102 is a restaurant, reward 3320 may be a free appetizer or desert.

In one example of operation, consumer 3106 wears product 3107 at venue 3102. Authentication device 2202 cooperates with server 2260 to automatically authenticate product 3107 when within view at venue 3102. Venue 3102 receives an indication of authentication from device 2202 and/or server 2260 and provides reward 3320 to consumer 3106.

Consumer 3106 makes a payment 3334 to clothing manufacturer 3306 for purchase of product 3107. Clothing manufacturer 3306 makes a payment 3336 to brand owner 3302 based upon license 3308, and which may include a portion of payment 3334. Clothing manufacturer 3306 also makes a payment 3338 to IR dye seller 3304 for purchase of IR dyes 3310. Brand owner 3302 makes a payment 3340 to IR dye seller 3304 for SDK license 3316.

Venue 3102 benefits from agreement 3314 by increased patronage, and may make a payment 3330 to IR dye seller 3304 for one or both of (a) SDK and consulting 3318 and (b) for each authenticated product 3107. Brand owner 3302 may provide a payment 3332 to venue 3102 based upon agreement 3314.

System 2200 authenticates product 3107 based upon IR fluorescence of dyes added during manufacturer of the product, and which are not necessarily visible to the human eye, thereby making forgery of product 3107 difficult if not practically impossible.

Figure 34:
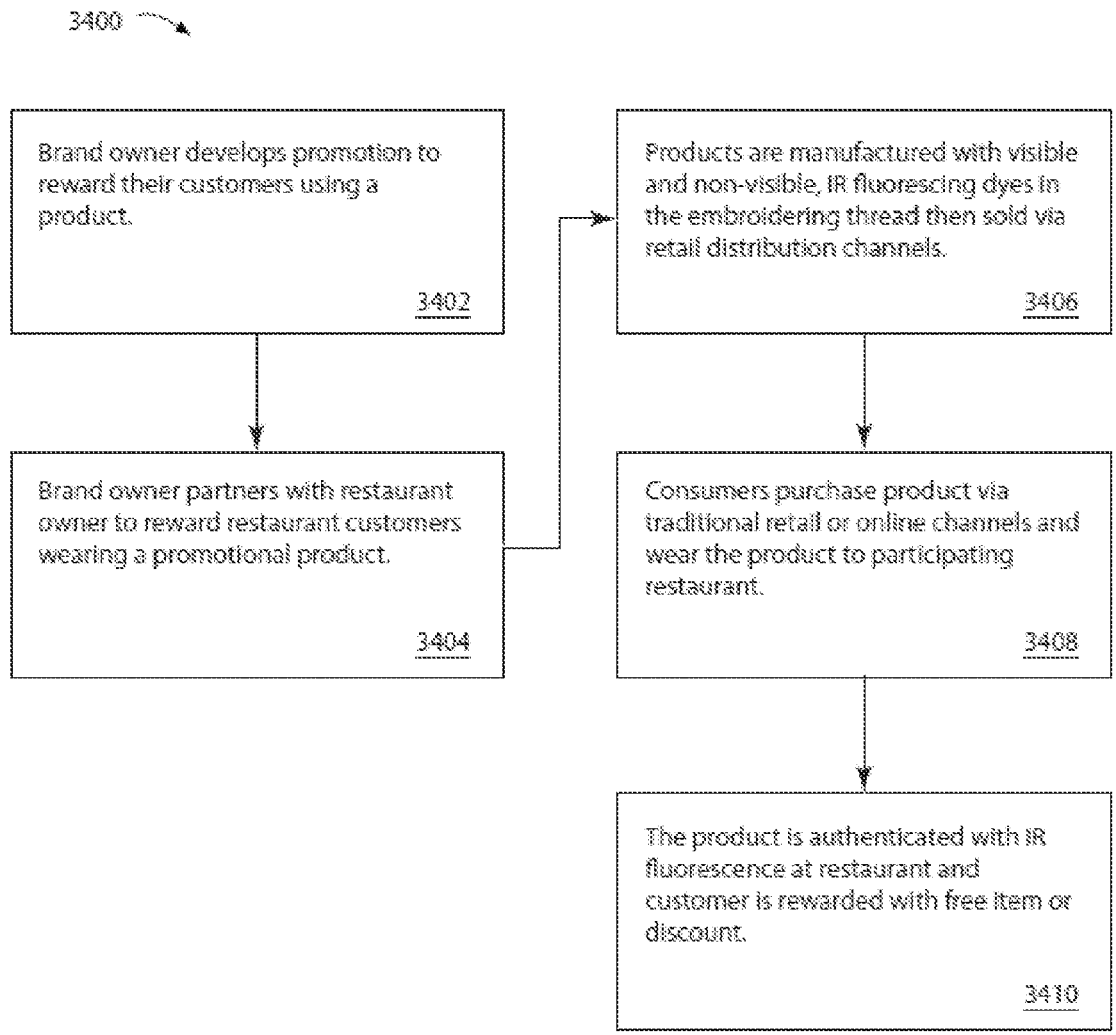
FIG. 34 is a flowchart illustrating exemplary involvement of entities for promoting sales of the product of FIG. 31 and/or for promoting patronage of the venue of FIG. 31.

FIG. 34 is a flowchart 3400 illustrating exemplary involvement of entities 3302, 3304, and 3306 for promoting sales of product 3107 and/or for promoting patronage of venue 3102. In step 3402, brand owner 3302 develops a promotion to reward their consumers 3106 using product 3107. In step 3404, brand owner 3302 partners with venue 3102 to reward venue customers wearing product 3107. In step 3406, products 3107 are manufactured to include both visible and non-visible IR fluorescing dyes that are for example included within the embroidering thread, and then sold via retail distribution channels. In step 3408, consumer 3106 purchases product 3107 via traditional retail or online channels and wears the product to venue 3102. In step 3410, product 3107 is authenticated by system 2200, based upon IR dyes 3310 includes within product 3107, and consumer 3106 is given reward 3320 (e.g., a free item and/or discount) at venue 3102.

Figure 35:
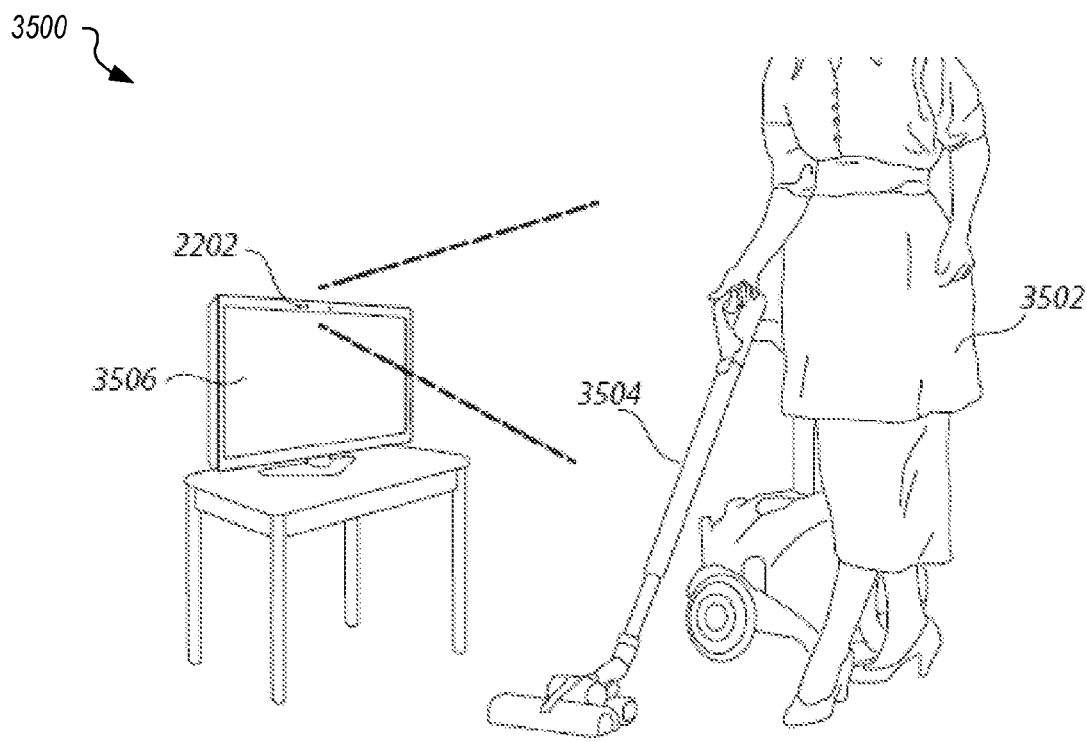
FIG. 35 shows one exemplary scenario where a person is using a new vacuum cleaner product in view of the authentication device of FIG. 22.

FIG. 35 shows one exemplary scenario 3500 where a person 3502 is using a new vacuum cleaner product 3504 in view of authentication device 2202. In this example, authentication device 2202 is configured with a television set 3506. However, authentication device 2202 may be configured with other household appliances without departing from the scope hereof.

Figure 36:
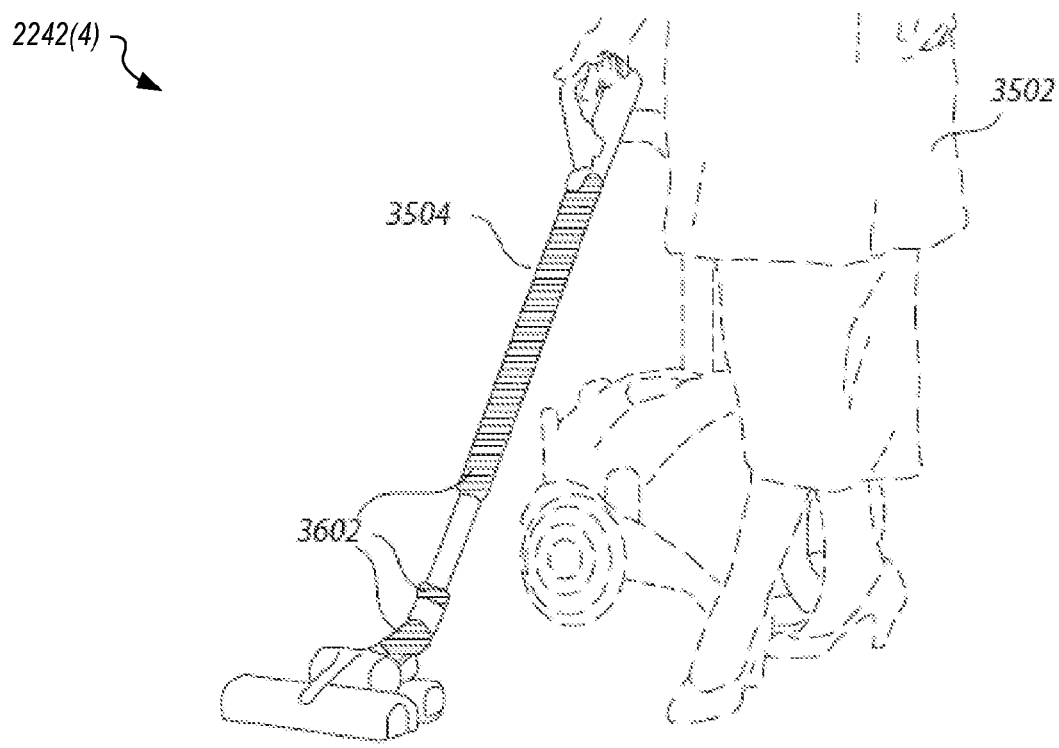
FIG. 36 shows one exemplary IR image captured by the authentication device of FIG. 22 in the scenario of FIG. 35.

FIG. 36 shows one exemplary IR image 2242(4) captured by authentication device 2202 of FIG. 35. Portions 3602 of product 3504 are manufactured with, or are coated (e.g., painted) with, IR fluorescing dyes that fluoresce and are captured within IR image 2242(4) when excited by IR projected from authentication device 2202. In one embodiment, authentication device 2202 periodically captures IR image 2242 and sends IR image 2242 to server 2260 for further processing. Software 2265 within server 2260 matches IR content (e.g., shapes and IR wavelength) of IR image 2242 against object list 2274 and identifies product 3504.

Server 2260 may notify a manufacturer of product 3504 each time product 2504 is identified and authenticated, or server 2260 may send summary statistics of each identification and authentication of product 3504 over a predefined period (e.g., a weekly summary of identification and authentication of product 3504). The manufacturer may, for a first received identification and authentication of product 3504, automatically register product 3504 in association with the user of authentication device 2202. Alternatively, the manufacturer may automatically enter a dialog with the user of authentication device 2202 for registering product 3504.

In one example of operation, the manufacturer automatically registers product 3504 for the user of authentication device 2202, and receives statistical information as to the frequency of use of product 3504.

Figure 37:
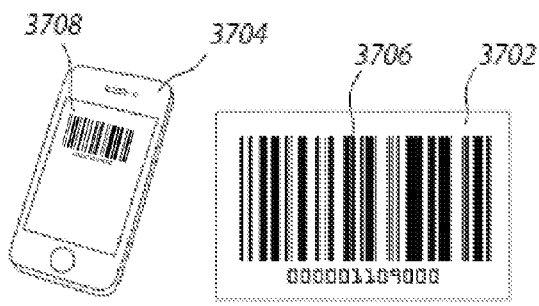
FIG. 37 shows one exemplary bar code label and a mobile device for capturing and authenticating information of the bar code label, in an embodiment.
Figure 38:
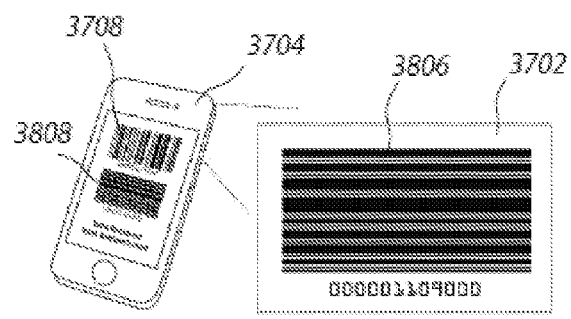
FIG. 38 shows the device of FIG. 37 capturing an IR image of the bar code label.

FIG. 37 shows one exemplary bar code label 3702 and a mobile device 3704 for capturing and authenticating information of bar code label 3702. Bar code label 3702 has a bar code 3706 printed with visible ink that is captured by device 3704 and displayed as bar code 3708 on a screen of device 3704. Bar code 3706 is also readable by conventional bar code readers. FIG. 38 shows device 3704 of FIG. 37 capturing IR image 2242(5) of bar code label 3702. FIGS. 37 and 38 are best viewed together with the following description.

Although bar codes are shown in these examples, other types or codes, symbols, lettering, and numbers may be used without departing from the scope hereof.

Bar code label 3702 also contains IR fluorescing dyes that fluoresce when excited by IR of a particular wavelength. In one embodiment, shown in FIG. 38, an IR bar code 3806 is printed using IR fluorescing dyes onto the substrate of bar code label 3702, either before or after bar code 3706 is printed. The IR fluorescing dyes, and thus IR bar code 3806, are not visible to the human eye or to RGB camera 2216. In another embodiment, a substrate of bar code label 3702 contains IR fluorescing dyes, wherein authentication is based upon presence of these dyes.

Device 3704 is a portable version of device 2202 of FIG. 22 and includes IR projector 2212, IR camera 2214, and RGB camera 2216. Device 3704 operates to capture RGB images and IR images. In one example of operation, device captures and displays bar code 3708 of bar code 3706 using RGB camera 2216. Device 3704 activates IR projector 2212 and captures IR image 2242 of IR bar code 3806. A visible version 3808 of IR image 2242 may be displayed by device 3704. Device 3704 may then authenticate information of bar code 3706 using IR bar code 3806 (or presence of IR fluorescence from bar code label 3702). In one embodiment, IR bar code 3806 contains additional information to compliment information provided in bar code 3706.

IR fluorescing inks may be incorporated into a printer cartridge (e.g., an inkjet printer cartridge) to facilitate adding information to object that is readable based upon IR fluorescence. In one embodiment, a printer cartridge has only IR ink. In another embodiment, one printer cartridge contains both visible ink (conventional ink) and IR ink such that information may be printed using IR ink together with visible information.

Figure 39:
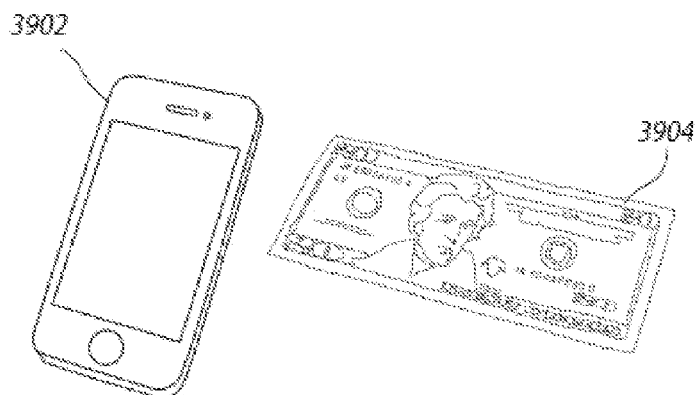
FIG. 39 shows a mobile authentication device and a twenty dollar bank note, in an embodiment.
Figure 40:
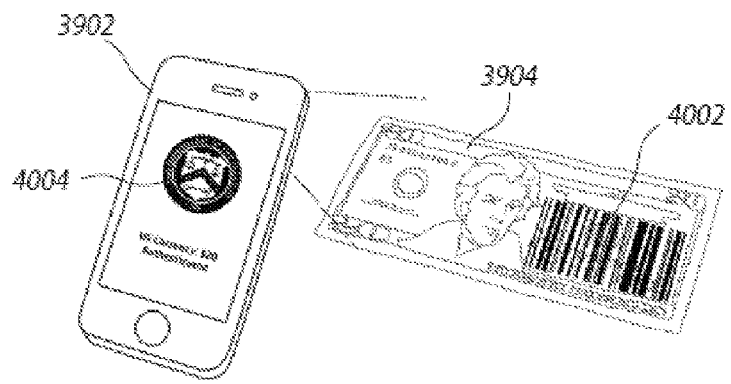
FIG. 40 shows an IR bar code printed onto a surface of the bank note of FIG. 39 that is captured within an IR image by the authentication device.

FIG. 39 shows a mobile device 3902 and a twenty dollar bank note 3904. Bank note 3904 is similar to conventional paper currency that includes conventional security features, but also includes IR fluorescing dyes (e.g., configured within its structure and/or printed onto a surface of its structure). Device 3902 is a portable version of device 2202 of FIG. 22 and includes IR projector 2212, IR camera 2214, and RGB camera 2216. FIG. 40 shows an IR bar code 4002 printed onto a surface of bank note 3904 that is captured within IR image 2242 by device 3902, and contains functionality for authenticating bank note 3904. In one example of operation, device 3902 activates IR projector 2212 and captures IR image 2242 using IR camera 2214. Authentication software within device 3902 then authenticates bank note 3904 based upon IR bar code 4002 captured within IR image 2242 and displays an indication 4004 of the determined authenticity. Optionally, IR bar code 4002 contains additional information, such as currency and value information of bank note 3904, wherein device 3902 displays the additional information together with determined authenticity.

Figure 41:
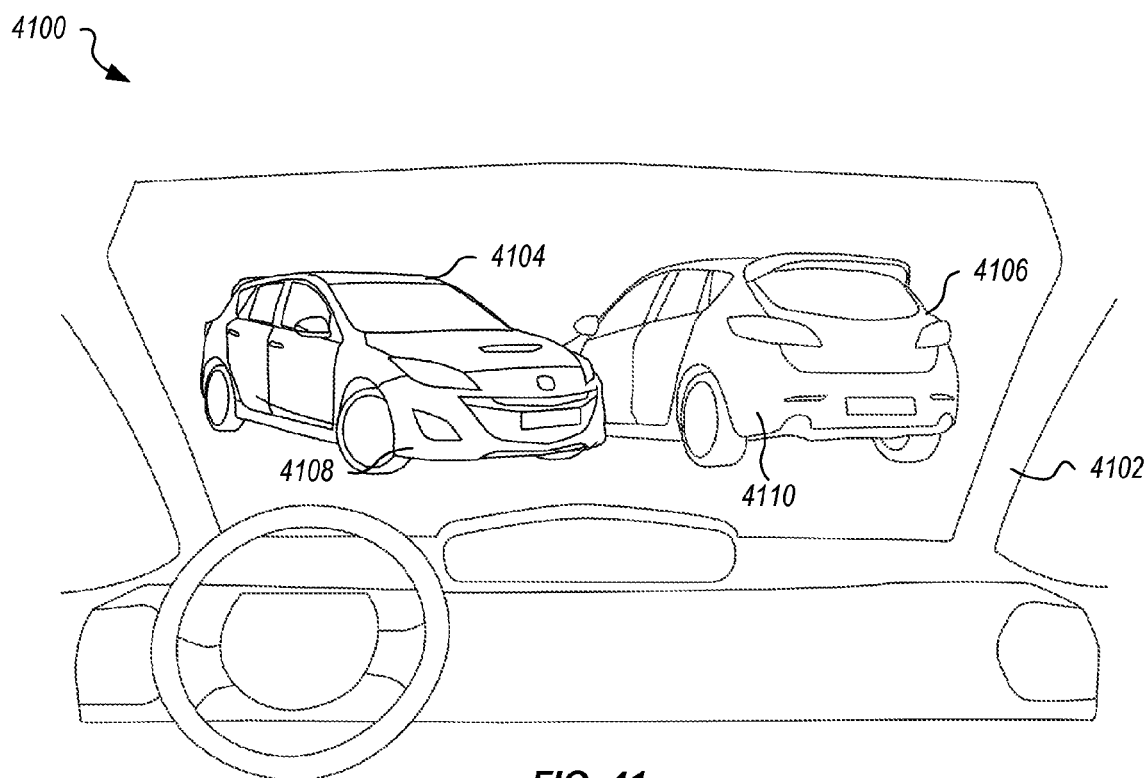
FIG. 41 shows one exemplary RGB image captured by the authentication device of FIG. 22 configured within a vehicle, in an embodiment.
Figure 42:
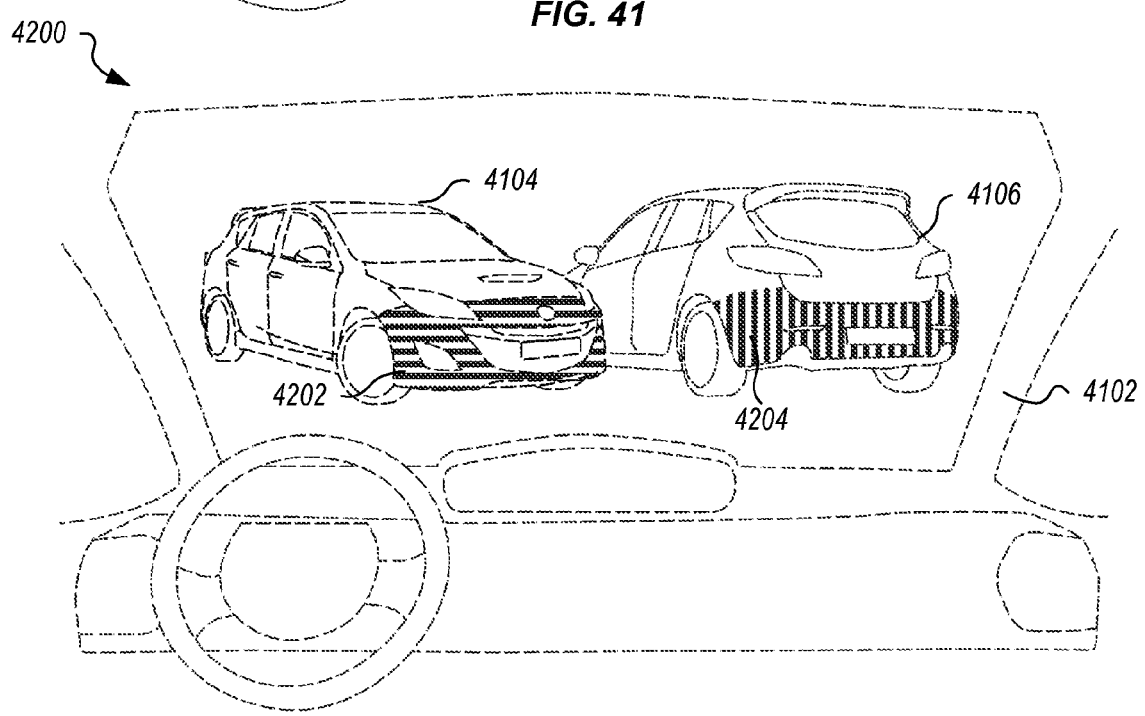
FIG. 42 shows an IR image captured by the authentication device of FIG. 41.

IR fluorescing dyes may be used in vehicle parts (e.g., includes within components of the vehicle or within paint or other coating of the vehicle) to enable differentiation between the different vehicle parts using IR. FIG. 41 shows an RGB image 4100 captured by an authentication device 2202 configured within a vehicle 4102. FIG. 42 shows an IR image 2242(6) captured by authentication device 2202. FIGS. 41 and 42 are best viewed together with the following description.

RGB image 4100 is a view through a front screen of vehicle 4102 and shows a front portion of a first external vehicle 4104 and a rear portion of a second external vehicle 4106. Conventional visual recognition techniques require significant processing power to determine which part of each vehicle 4104 and 4106 they are viewing. By incorporating at least two different IR fluorescing dyes within certain vehicle parts (e.g., front and rear bumpers 4108 and 4110, respectively), authentication device 2202 may, based upon captured IR image 4200, identify and determine a direction of other vehicles. For example, where a first IR fluorescing dye used in front bumper 4108 fluoresces at a first IR wavelength (indicated with a first shading 4202) and a second IR fluorescing dye used in rear bumper 4110 fluoresces at a second IR wavelength (indicated by a second shading 4204), authentication device 2202 may easily determine whether the front or rear of each vehicle 4104 and 4106 is visible based upon detected IR wavelength 4202, 4204 within IR image 2242. Further, by detecting presence of IR fluorescence within IR image 4200, presence of one or more vehicles may be authenticated. Authentication and orientation information based upon detection of IR fluorescence may be used to improve decision within collision detection and avoidance systems. It will be appreciated that other vehicle parts may incorporate IR fluorescing dyes, for example, front and rear fenders.

In an alternative embodiment, front and rear license plates of each vehicle may be configured with one of the first and second IR fluorescing dyes and thereby used to authenticate presence and determine direction of a vehicle. Further, use of IR fluorescing dyes within license plates may prove additional authentication of vehicle identification. For example, IR fluorescing dyes may be used to encode additional vehicle information within the license plate that may be read by license plate reading devices that incorporate functionality of authentication device 2202 (e.g., when used for identifying vehicles at toll booths, during police stops, and so on).

3D scanners often use IR beams to measure depth when scanning a 3D object. In one embodiment, an IR fluorescing dye that absorbs IR at a first wavelength and emits IR at a second wavelength may be incorporated into an object. Where the first IR wavelength is the same as the IR wavelength used by the 3D scanner, by absorbing IR at the first wavelength the IR fluorescing dye prevents the 3D scanner from scanning the 3D object. Thus, by incorporating the IR fluorescing dye within the 3D object, that object is protected from being scanned by 3D scanners. That is, the 3D object is protected from being copied.

Combinations of Features

Features described above as well as those claimed below may be combined in various ways without departing from the scope hereof. The following examples illustrate possible, non-limiting combinations of features of the inventions described above. It should be clear that many changes and modifications may be made to the systems and methods described above without departing from the spirit and scope of this invention:

(a) A system for authenticating an object configured with an infrared (IR) fluorescing material that fluoresces at a first IR wavelength when excited by IR of a second wavelength includes: an IR projector for projecting IR at a second wavelength onto the object; an IR camera having a field of view of the object for capturing an IR image of the object at the first wavelength; and a processor executing an algorithm to perform the steps of: controlling the IR projector to generate IR at the second wavelength and to project the IR at the second wavelength onto the object; controlling the IR camera to capture the IR image; and authenticating the objected based upon detected IR at the first wavelength within the IR image.

(b) In the system denoted as (a), an RGB camera may capture an RGB image of the object, wherein the RGB image and the IR image are processed to determine an identification of the object, determine a location of the object, and determine an orientation of the object.

(c) In the system/s denoted as (a) or (b), a virtual object is stored within a virtual environment of a memory, based upon the determined identification, location, and orientation.

(d) In the system/s denoted as (a)-(c) a display renders a display of a virtual object within a virtual environment.

(e) A method for authenticating an object using IR includes the steps of: projecting IR at a first wavelength onto the object; capturing a first image of the object during the projection of the IR; and authenticating the object by processing the first image to detect IR fluorescence from an IR fluorescing material incorporated into the object in response to the projected IR. Presence of the IR fluorescence within the first image indicates authentication of the object.

(f) In the method denoted as (e), a second image of the object may be captured when no IR is projected at the object; and the second image may be subtracted from the first image prior to the step of authenticating.

(g) In the method/s denoted as (e) and (f), the first image may be an IR image captured by an IR camera, wherein the fluorescence from the IR fluorescing material has a wavelength detected by the IR camera.

(h) In the method/s denoted as (e)-(g), the first image may be processed to determine one or more of an identity of the object, a location of the object, and an orientation of the object by comparing at least part of the first image to a definition of the object.

(i) In the method/s denoted as (e)-(h), a virtual object may be generated based upon the authentication, and one or more of an identity of the object, a location of the object, and an orientation of the object, wherein the virtual object represents the object within a memory of a computer.

(j) In the method/s denoted as (e)-(i), a first wavelength of IR fluorescence from the object in response to the IR projected at the first wavelength may be measured, wherein authentication is based upon the first measured wavelength matching a first predefined IR fluorescence wavelength for the object.

(k) In the method/s denoted as (j), IR may be projected at a second wavelength onto the object; a second image of the object may be captured; and a second wavelength of fluorescence from the object in response to the projected IR at the second wavelength may be measured. The step of authenticating includes comparing the second measured wavelength to a second predefined wavelength for the object.

(l) In the method/s denoted as (e)-(k), a signal indicative of the authentication may be generated for use in a game being played by a player associated with the object, wherein the signal enables additional functionality of the game during game play.

(m) In the method/s denoted as (e)-(l), a signal indicative of the authentication of the object may be generated for use by an advertisement carrier when the advertisement carrier is displaying an advertisement associated with the object, wherein the advertisement carrier rewards a viewer of the advertisement based upon the indicated authentication.

(n) In the method/s denoted as (e)-(m), a signal indicative of the authentication of the object may be generated for use by an operator of a venue in which the object is located, wherein the operator rewards a customer associated with the object based upon the indicated authentication.

(o) In the method/s denoted as (e)-(n), a signal indicative of the authentication of the object may be generated to a manufacturer of the object, wherein the manufacturer automatically registers the object to a user of an authentication device implementing the method.

(p) In the method/s denoted as (e)-(o), statistical information of authentication of the same object may be generated and periodically sent to the/a manufacturer of the object.

(q) In the method/s denoted as (e)-(p), the authentication of the object may be displayed to a user, wherein the object is a bar code label with a human visible bar code containing information.

(r) In the method denoted as (q), information may be determined in addition to information of the human visible bar code from an IR bar code of the bar code label.

(s) In the method/s denoted as (e)-(r), the authentication of the object may be displayed to a user of a device implementing the method/s, wherein the object is a bank note.

(t) In the method denoted as (s), information associated with the bank note may be determined from IR fluorescing material incorporated into the bank note.

(u) A method for identifying a model constructed from a plurality of components, wherein at least two key components are configured with an IR fluorescing material that has IR fluoresce at a first wavelength when excited by IR of a second wavelength, includes steps of: projecting, from an IR projector, IR at the second wavelength onto the model and capturing, using an IR camera, a first image of the model during the projection of the IR. Based upon the IR fluorescence, each of the at least two key components within the image are identified. Relative positions of the key components to one another are determined based upon the first image, and the model is identified based upon the relative positions.

(v) In the method denoted as (u), a virtual object may be added to a virtual environment based upon the identified model.

(w) In the method denoted as (v), the virtual object may be positioned within the virtual environment based upon a determined position of the model within the first image.

(x) In the method/s denoted as (u)-(w), the key components may be authenticated based upon a detected IR wavelength captured from the key components by the IR camera during operation of the IR projector.

(y) An educational tool for identifying a model configured with an IR fluorescing material that fluoresces at a first wavelength when excited by IR at a second wavelength includes an IR projector for projecting IR at the second wavelength onto the model. An IR camera has a field of view of the model for capturing an IR image of the model. A processor executes an algorithm to perform the steps of: controlling the IR projector to generate IR at the second wavelength and project the IR at the second wavelength onto the model; controlling the IR camera to capture the IR image during the projection; and identifying the model based upon IR fluorescence at the first wavelength within the IR image.

(z) In the tool denoted as (y), the model may be constructed from a plurality of components, wherein at least two of the components are configured with an IR fluorescing material and the other ones of the components are not configured with the IR fluorescing material.

(aa) In the tool/s denoted as (y) and (z), the model may be identified based upon relative positions of at least two components configured with the IR fluorescing material to one another within the IR image.

(bb) In the tool/s denoted as (y)-(aa), the model may be constructed from a malleable compound configured with an IR fluorescing material, and identified based upon the shape of the captured IR fluorescence at the first wavelength.

(cc) In the tool/s denoted as (y)-(bb), a virtual environment within a memory may store a virtual model based upon the identified model, wherein the virtual model is rendered on a screen of the educational tool based upon the virtual environment.

(dd) In the tool denoted as (y)-(cc), a virtual model may be positioned within a virtual environment by positioning the model relative to the IR projector and IR camera.

(ee) A system for determining orientation of a vehicle, wherein a first portion of the vehicle is configured with a first IR fluorescing material that fluoresces at a first wavelength when excited by IR at a second wavelength and wherein a second portion of the vehicle is configured with a second IR fluorescing material that fluoresces at a third wavelength when excited by the IR at the second wavelength, includes: an IR projector for projecting IR at the second wavelength onto the vehicle and an IR camera having a field of view of the vehicle for capturing an IR image of the vehicle. A processor executes an algorithm to perform the steps of: controlling the IR projector to generate IR at the second wavelength and to project the IR at the second wavelength onto the vehicle; controlling the IR camera to capture the IR image; and determining the orientation of the vehicle based upon the wavelength of IR captured within the IR image and the location of the first and second portions on the vehicle.

(ff) In the system denoted as (ee), the first portion of the vehicle may be a front fender of the vehicle and the second portion may be a rear fender of the vehicle.

(gg) In the system denoted as (ee), the first portion may be a front fender or front license plate of the vehicle and the second portion may be a rear fender or a rear license plate of the vehicle.

(hh) A method for determining orientation of a vehicle, wherein a first portion of the vehicle is configured with a first IR fluorescing material that fluoresces at a first wavelength when excited by IR at a second wavelength and wherein a second portion of the vehicle is configured with a second IR fluorescing material that fluoresces at a third wavelength when excited by IR at the second wavelength, includes the steps of: projecting IR at the second wavelength onto the vehicle and capturing an IR image of the vehicle while projecting the IR. Orientation of the vehicle is determined based upon the wavelength of IR fluorescence captured within the IR image and the location of the first and second portions on the vehicle; wherein the first portion is located at the front of the vehicle and the second portion is located at the rear of the vehicle.

(ii) In the method denoted as (hh), the first portion may be a front fender or front license plate of the vehicle and the second portion may be a rear fender or rear license plate of the vehicle.

(jj) A method for preventing 3D copying of an object by a 3D scanner that uses infrared (IR) at a first IR wavelength for depth detection includes configuring the object with an IR fluorescing material that fluoresces at a second IR wavelength when excited by IR at the first wavelength. The IR fluorescing material absorbs IR at the first wavelength and emits IR at the second IR wavelength which is not detectable by the 3D scanner.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for authenticating an object configured with an infrared (IR) fluorescing material that fluoresces at a first IR wavelength when excited by IR of a second wavelength, comprising:
    an IR projector for projecting IR at a second wavelength onto the object;
    an IR camera having a field of view of the object for capturing an IR image of the object at the first wavelength
    an RGB camera for capturing an RGB image of the object; and
    a processor executing an algorithm to perform the steps of:
        controlling the IR projector to generate IR at the second wavelength and to project the IR at the second wavelength onto the object;
        controlling the IR camera to capture the IR image; and
        authenticating the objected based upon detected IR at the first wavelength within the IR image;
    wherein processing the RGB image and the IR image are processed to determine an identification of the object, determine a location of the object, and determine an orientation of the object.

2. The system of claim 1, further comprising a virtual environment stored within a memory, wherein a virtual object is stored within the virtual environment based upon the determined identification, location, and orientation.

3. The system of claim 2, further comprising a display for displaying a rendered image of the virtual object within the virtual environment.

4. A method for authenticating an object using IR, comprising the steps of:
    projecting IR at a first wavelength onto the object;
    capturing a first image of the object during the projection of the IR;
    capturing a second image of the object when no IR is projected at the object;
    subtracting the second image from the first image; and then
    authenticating the object by processing the first image to detect IR fluorescence from an IR fluorescing material incorporated into the object in response to the projected IR, wherein presence of the IR fluorescence within the first image indicates authentication of the object.

5. A method for authenticating an object using IR, comprising the steps of:
    projecting IR at a first wavelength onto the object;
    capturing a first image of the object during the projection of the IR;
    authenticating the object by processing the first image to detect IR fluorescence from an IR fluorescing material incorporated into the object in response to the projected IR, wherein presence of the IR fluorescence within the first image indicates authentication of the object; and
    processing the first image to determine one or more of an identity of the object, a location of the object, and an orientation of the object by comparing at least part of the first image to a definition of the object.

6. The method of claim 5, further comprising generating a virtual object based upon the authentication, and one or more of the identity, the location, and the orientation, wherein the virtual object represents the object within a memory of a computer.

7. A method for authenticating an object using IR, comprising the steps of:
    projecting IR at a first wavelength onto the object;
    capturing a first image of the object during the projection of the IR;

measuring a first measured wavelength of IR fluorescence from the object in response to the IR projected at the first wavelength projecting IR at a second wavelength onto the object;

capturing a second image of the object;

measuring a second measured wavelength of fluorescence from the object in response to the projected IR at the second wavelength; and authenticating the object by processing the first image to detect IR fluorescence from an IR fluorescing material incorporated into the object in response to the projected IR and by comparing the second measured wavelength to a second predefined wavelength for the object;

wherein authentication of the object-is indicated by-presence of the IR fluorescence within the first image, the first measured wavelength matching a first predefined IR fluorescence wavelength for the object, and the second measured wavelength matching a second predefined wavelength for the object.

8. A method for authenticating an object using IR, comprising the steps of:

projecting IR at a first wavelength onto the object;

capturing a first image of the object during the projection of the IR;

authenticating the object by processing the first image to IR fluorescence from an IR fluorescing material incorporated into the object in response to the projected IR, wherein presence of the IR fluorescence within the first image indicates authentication of the object; and generating a signal indicative of the authentication for use in a game being played by a player associated with the object, wherein the signal enables additional functionality of the game during game play.

9. A method for authenticating an object using IR, comprising the steps of:

projecting IR at a first wavelength onto the object;

capturing a first image of the object during the projection of the IR;

authenticating the object by processing the first image to detect IR fluorescence from an IR fluorescing material incorporated into the object in response to the projected IR, wherein presence of the IR fluorescence within the first image indicates authentication of the object; and generating a signal indicative of the authentication of the object for use by an advertisement carrier when the advertisement carrier is displaying an advertisement associated with the object, wherein the advertisement carrier rewards a viewer of the advertisement based upon the indicated authentication.

10. A method for authenticating an object using IR, comprising the steps of:

projecting IR at a first wavelength onto the object;

capturing a first image of the object during the projection of the IR;

authenticating the object by processing the first image to detect IR fluorescence from an IR fluorescing material incorporated into the object in response to the projected IR, wherein presence of the IR fluorescence within the first image indicates authentication of the object; and generating a signal indicative of the authentication of the object for use by an operator of a venue in which the object is located, wherein the operator rewards a customer associated with the object based upon the indicated authentication.

11. A method for authenticating an object using IR, comprising the steps of:

projecting IR at a first wavelength onto the object;

capturing a first image of the object during the projection of the IR; and authenticating the object by processing the first image to detect IR fluorescence from an IR fluorescing material incorporated into the object in response to the projected IR, wherein presence of the IR fluorescence within the first image indicates authentication of the object; and generating a signal indicative of the authentication of the object to a manufacturer of the object, wherein the manufacturer automatically registers the object to a user of an authentication device implementing the method.

12. The method of claim 11, further comprising generating statistical information of authentication of the same object and periodically sending the statistical information to the manufacturer.

13. A method for identifying a model constructed from a plurality of components, wherein at least two key components are configured with an IR fluorescing material that has IR fluoresce at a first wavelength when excited by IR of a second wavelength, comprising the steps of:

projecting, from an IR projector, IR at the second wavelength onto the model;

capturing, using an IR camera, a first image of the model during the projection of the IR;

identifying, based upon the IR fluorescence, each of the at least two key components within the image;

determining relative positions of the key components to one another based upon the first image; and identifying the model based upon the relative positions.

14. The method of claim 13, further comprising the step of adding a virtual object to a virtual environment based upon the identified model.

15. The method of claim 14, further comprising the step of positioning the virtual object within the virtual environment based upon a determined position of the model within the first image.

16. The method of claim 13, further comprising the step of authenticating the key components based upon a detected IR wavelength captured from the key components by the IR camera during operation of the IR projector.

* * * * *